US012682837B2

(12) United States Patent
Kim et al.

(10) Patent No.: US 12,682,837 B2
(45) Date of Patent: Jul. 14, 2026

(54) DISPLAY DEVICE AND ELECTRONIC DEVICE INCLUDING THE SAME

(71) Applicant: Samsung Display Co., LTD., Yongin-si (KR)

(72) Inventors: Dong Woo Kim, Yongin-si (KR); Kwi Hyun Kim, Yongin-si (KR); Sang Jin Jeon, Yongin-si (KR); Jung Hwan Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/082,743

(22) Filed: Mar. 18, 2025

(65) Prior Publication Data

US 2025/0391326 A1 Dec. 25, 2025

(30) Foreign Application Priority Data

Jun. 19, 2024 (KR) ........................ 10-2024-0079619

(51) Int. Cl.
*G09G 3/32* (2016.01)

(52) U.S. Cl.
CPC ....... *G09G 3/32* (2013.01); *G09G 2300/0819* (2013.01); *G09G 2310/0275* (2013.01); *G09G 2310/08* (2013.01); *G09G 2320/0238* (2013.01); *G09G 2330/021* (2013.01)

(58) Field of Classification Search
CPC ............. G09G 3/32; G09G 2300/0819; G09G 2310/0275; G09G 2310/08; G09G 2320/0238; G09G 2330/021
See application file for complete search history.

(56) References Cited

U.S. PATENT DOCUMENTS

2021/0312855 A1* 10/2021 Jeong ........................ G09G 3/32
2021/0312856 A1* 10/2021 Jeong ........................ G09G 5/18
2022/0101783 A1* 3/2022 Han .......................... G09G 3/32
2022/0301500 A1* 9/2022 Shigeta ..................... G09G 3/32
2023/0078842 A1* 3/2023 Kim ..................... G09G 3/2081 257/443
2023/0082959 A1* 3/2023 Jeong .................... G06F 3/1446 345/55
2023/0120477 A1* 4/2023 Hwang ................ G09G 3/2081
(Continued)

FOREIGN PATENT DOCUMENTS

KR 10-2021-0131852 11/2021
KR 10-2022-0052265 4/2022
(Continued)

*Primary Examiner* — Dmitriy Bolotin
(74) *Attorney, Agent, or Firm* — CANTOR COLBURN LLP

(57) ABSTRACT

A display device includes a first transistor controlling a control current based on a voltage of a first node, a second transistor electrically connecting a second node to a data line based on a first scan write signal, a third transistor electrically connecting a third node to the first node based on the first scan write signal, a fourth transistor controlling a driving current supplied to the light-emitting element based on a voltage of a fourth node that receives the control current, a fifth transistor electrically connecting a fifth node to the data line based on a second scan write signal, and a sixth transistor t electrically connecting a sixth node to the fourth node based on the second scan write signal.

20 Claims, 16 Drawing Sheets

(56) References Cited

U.S. PATENT DOCUMENTS

| | | | | |
|---|---|---|---|---|
| 2023/0121681 | A1* | 4/2023 | Hwang | G09G 3/2014 345/55 |
| 2023/0186836 | A1* | 6/2023 | Jeong | G09G 3/2081 345/55 |
| 2023/0230957 | A1* | 7/2023 | Kim | H10D 86/451 345/690 |
| 2023/0238398 | A1* | 7/2023 | Choi | H10D 86/60 |
| 2025/0104614 | A1* | 3/2025 | Kim | G09G 3/32 |
| 2025/0104627 | A1 | 3/2025 | Kim et al. | |
| 2025/0322785 | A1* | 10/2025 | Shin | G09G 3/32 |

FOREIGN PATENT DOCUMENTS

| | | |
|---|---|---|
| KR | 10-2023-0023482 | 2/2023 |
| KR | 10-2498084 | 2/2023 |
| KR | 20250047538 A | 4/2025 |

* cited by examiner

DISPLAY DEVICE AND ELECTRONIC DEVICE INCLUDING THE SAME

CROSS-REFERENCE TO RELATED APPLICATION(S)

This application claims priority to and benefits of Korean Patent Application No. 10-2024-0079619 under 35 U.S.C. § 119, filed on Jun. 19, 2024, in the Korean Intellectual Property Office, the entire contents of which are incorporated herein by reference.

BACKGROUND

1. Technical Field

Embodiments relate to a display device and an electronic device including the display device.

2. Description of the Related Art

As the information society develops, the demand for display devices for displaying images is increasing in various forms. Display devices can be flat panel display devices such as liquid crystal display (LCD) devices, field emission display (FED) devices, and organic light-emitting display devices.

Examples of a light-emitting display device may include organic light-emitting display devices containing organic light-emitting diodes (OLEDs) and an inorganic light-emitting display device containing inorganic light-emitting diodes (LEDs). The organic light-emitting display device can adjust the brightness or gradation of light emitted by the OLEDs by adjusting the magnitude of the driving current applied to the OLEDs. Since the inorganic LEDs emit light of different wavelengths depending on the driving current, the quality of an image may deteriorate if the inorganic LEDs are driven in the same manner as the OLEDs.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a display device which reduces power consumption, facilitates variable frequency driving, and improves the expression of peak black gradation.

However, embodiments are not limited to those set forth herein. The above and other embodiments will be apparent to one of ordinary skill in the art to which the disclosure pertains by referencing the detailed description of the disclosure given below.

According to an aspect of the disclosure, a display device may include a light-emitting element; a first transistor that controls a control current based on a voltage of a first node; a second transistor that electrically connects a second node, which is a first electrode of the first transistor, to a data line based on a first scan write signal; a third transistor that electrically connects a third node, which is a second electrode of the first transistor, to the first node based on the first scan write signal; a fourth transistor that controls a driving current supplied to the light-emitting element based on a voltage of a fourth node that receives the control current; a fifth transistor that electrically connects a fifth node, which is a first electrode of the fourth transistor, to the data line based on a second scan write signal; and a sixth transistor that electrically connects a sixth node, which is a second electrode of the fourth transistor, to the fourth node based on the second scan write signal.

The data line may supply a first data voltage with a gradation value during a period in case that the second and third transistors are turned on. The data line may supply a second data voltage that is a constant voltage during a period in case that the fifth transistor and the sixth transistor are turned on.

The display device may further include a sweep line that supplies a sweep signal with a pulse linearly decreasing from a gate-high voltage to a gate-low voltage, and a first capacitor having a first capacitor electrode electrically connected to the first node and a second capacitor electrode electrically connected to the sweep line.

The first transistor, the second transistor, the third transistor, the fourth transistor, the fifth transistor and the sixth transistor may include an oxide-based semiconductor layer. The display device may further include a seventh transistor that supplies a first high potential voltage to the third node based on an emission signal, and an eighth transistor that electrically connects the second node and the fourth node based on the emission signal.

The display device may further include a ninth transistor that supplies a second high potential voltage to the sixth node based on the emission signal, and a tenth transistor that electrically connects the fifth node and the seventh node, which is a first electrode of the light-emitting element, based on the emission signal.

The seventh transistor, the eighth transistor, the ninth transistor and the tenth transistor may include a low-temperature polysilicon based semiconductor layer.

The display device may further include an eleventh transistor that discharges the first node to an initialization voltage based on a first scan initialization signal, and a twelfth transistor that discharges the fourth node to the initialization voltage based on a second scan initialization signal.

The display device may further include a first low potential line that supplies a first low potential voltage to a second electrode of the light-emitting element, and a thirteenth transistor that discharges the seventh node to a second low potential voltage based on the voltage of the fourth node.

The eleventh transistor and the twelfth transistor may include an oxide-based semiconductor layer. The thirteenth transistor may include a low-temperature polysilicon based semiconductor layer.

The display device may further include a first low potential line that supplies a first low potential voltage to a second electrode of the light-emitting element, and a thirteenth transistor that discharges the seventh node to a second low potential voltage based on an anode initialization signal.

According to an aspect of the disclosure, a display device may include a light-emitting element; a first transistor that controls a control current based on a voltage of a first node; a second transistor that electrically connects a second node, which is a first electrode of the first transistor, to a data line during a first period a third transistor that electrically connects a third node, which is a second electrode of the first transistor, to the first node during the first period; a fourth transistor that controls a driving current supplied to the light-emitting element based on a voltage of a fourth node that receives the control current; a fifth transistor that electrically connects a fifth node, which is a first electrode of the fourth transistor, to the data line during a second period subsequent to the first period, and a sixth transistor that electrically connects a sixth node, which is a second electrode of the fourth transistor, to the fourth node during the second period.

The data line may supply a first data voltage with a gradation value during the first period. The data line may supply a second data voltage that is a constant voltage during the second period.

The display device may further include a sweep line that supplies a sweep signal with a pulse linearly decreasing from a gate-high voltage to a gate-low voltage during a third period subsequent to the second period, and a first capacitor having a first capacitor electrode electrically connected to the first node and a second capacitor electrode electrically connected to the sweep line.

The second transistor and the third transistor may be turned on during the first period by receiving a high-level first scan write signal. The fifth transistor and the sixth transistor may be turned on during the second period by receiving a high-level first scan write signal.

The display device may further include a seventh transistor that supplies a first high potential voltage to the third node during a third period subsequent to the second period and an eighth transistor that electrically connects the second node and the fourth node during the third period.

The display device may further include a ninth transistor that supplies a second high potential voltage to the sixth node during the third period, and a tenth transistor that electrically connects the fifth node and the seventh node, which is a first electrode of the light-emitting element, during the third period.

The seventh transistor, the eighth transistor, the ninth transistor and the tenth transistor may be turned on by receiving a low-level emission signal during the third period.

The display device may further include an eleventh transistor that discharges the first node to an initialization voltage during a fourth period prior to the first period, and a twelfth transistor that discharges the fourth node to the initialization voltage during the fourth period.

The display device may further include a first low potential line that supplies a first low potential voltage to a second electrode of the light-emitting element, and a thirteenth transistor that discharges the seventh node to a second low potential voltage during a fifth period subsequent to the third period.

The eleventh transistor may be turned on during the fourth period by receiving a high-level first scan initialization signal. The twelfth transistor may be turned on during the fourth period and the fifth period by receiving a high-level second scan initialization signal.

According to an aspect of the disclosure, a display device may include a first pixel disposed in a first row; and a second pixel disposed in a second row subsequent to the first row. The first pixel may include a (1-1)-th light-emitting element; a (1-1)-th transistor that controls a control current based on a voltage of a gate electrode of the (1-1)-th transistor; a (1-2)-th transistor that electrically connects a first electrode of the (1-1)-th transistor to a data line during a first half of a first period, a (1-3)-th transistor that electrically connects a second electrode of the (1-1)-th transistor to the gate electrode of the (1-1)-th transistor during the first half of the first period; a (1-4)-th transistor that controls a driving current supplied to the (1-1)-th light-emitting element based on a voltage of a first node that receives the control current of the (1-1)-th transistor; a (1-5)-th transistor that electrically connects a first electrode of the (1-4)-th transistor to the data line during a second half of the first period; and a (1-6)-th transistor that electrically connects a second electrode of the (1-4)-th transistor to the first node during the second half of the first period. The second pixel may include a second light-emitting element; a (2-1)-th transistor that controls a control current based on a voltage of a gate electrode of the (2-1)-th transistor; a (2-2)-th transistor that electrically connects a first electrode of the (2-1)-th transistor to a data line during the first half of the second period subsequent to the first period; a (2-3)-th transistor that electrically connects a second electrode of the (2-2)-th transistor to a gate electrode of the (2-1)-th transistor during the first half of the second period; a (2-4)-th transistor that controls a driving current supplied to the second light-emitting element based on a voltage of a second node that receives the control current of the (2-1)-th transistor; a (2-5)-th transistor that electrically connects a first electrode of the (2-4)-th transistor to the data line during the second half of the second period; and a (2-6)-th transistor that electrically connects a second electrode of the (2-4)-th transistor to the second node during the second half of the second period.

An electronic device may include the display device.

In the electronic device, the data line may supply a first data voltage with a gradation value during a period in case that the second transistor and the third transistor are turned on, and the data line supplies a second data voltage that is a constant voltage during a period in case that the fifth transistor and the sixth transistor are turned on.

In the electronic device, the display device may include: a sweep line that supplies a sweep signal with a pulse linearly decreasing from a gate-high voltage to a gate-low voltage; and a first capacitor having a first capacitor electrode electrically connected to the first node and a second capacitor electrode electrically connected to the sweep line.

The electronic device may be at least one of a smart watch, a mobile phone, a smartphone, a portable computer, a tablet personal computer (PC), a watch phone, an automotive display, a smart glass, a portable multimedia player (PMP), a navigation system, an ultra mobile computer (UMPC), a head mounted display (HMD) device, a virtual reality (VR) device, a mixed reality (MR) device, and an augmented reality (AR) device.

According to an embodiment, by reducing the number of transistors and signal lines compared to conventional pixel circuitry including a pulse width modulator and a constant current generator, it is possible to reduce power consumption, facilitate variable frequency driving, and improve the expression of peak black gradation.

BRIEF DESCRIPTION OF THE DRAWINGS

The accompanying drawings, which are included to provide a further understanding of the disclosure, illustrate embodiments in which.

DETAILED DESCRIPTION OF THE EMBODIMENTS

Figure 1:
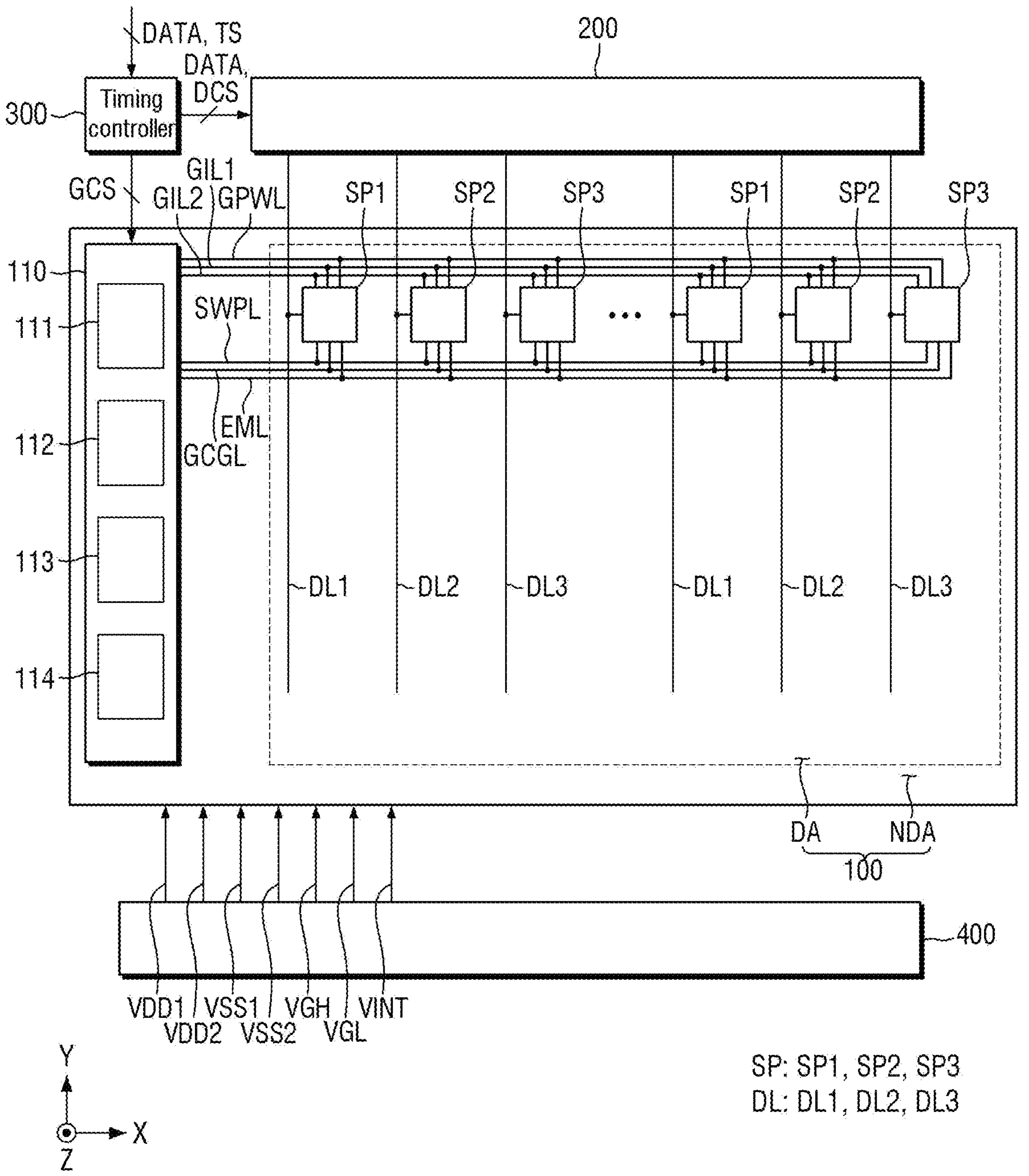
FIG. 1 is a block diagram illustrating a display device according to an embodiment of the disclosure.

The embodiments will now be described more fully hereinafter with reference to the accompanying drawings. The embodiments may, however, be provided in different forms and should not be construed as limiting. The same reference numbers indicate the same components throughout the disclosure. In the accompanying figures, the thickness of layers and regions may be exaggerated for clarity.

Some of the parts which are not associated with the description may not be provided in order to describe embodiments of the disclosure.

It will also be understood that when a layer is referred to as being "on" another layer or substrate, it can be directly on another layer or substrate, or intervening layers may also be present. In contrast, when an element is referred to as being "directly on" another element, there may be no intervening elements present.

Further, the phrase "in a plan view" means when an object portion is viewed from above, and the phrase "in a schematic cross-sectional view" means when a schematic cross-section taken by vertically cutting an object portion is viewed from the side.

The terms "overlap" or "overlapped" mean that a first object may be above or below or to a side of a second object, and vice versa. The term "overlap" may include layer, stack, face or facing, extending over, covering, or partly covering or any other suitable term as would be appreciated and understood by those of ordinary skill in the art. The expression "not overlap" may include "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

When an element is referred to as being "connected" or "coupled" to another element, the element may be "directly connected" or "directly coupled" to another element, or "electrically connected" or "electrically coupled" to another element with one or more intervening elements interposed therebetween.

It will be further understood that when the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within about ±30%, 20%, 10%, 5% of the stated value.

As used herein, the singular forms, "a," "an," and "the" are intended to include the plural forms as well, unless the context clearly indicates otherwise.

In the description, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the description, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the description.

FIG. 1 is a block diagram illustrating a display device according to an embodiment of the disclosure.

Referring to FIG. 1, the display device may include a display panel 100, a gate driver 110, a data driver 200, a timing controller 300, and a power supply 400.

A display area DA of the display panel 100 may include pixels SP, which display an image, first scan initialization lines GIL1, second scan initialization lines GIL2, first scan write lines GPWL, second scan write lines GCGL, emission lines EML, sweep lines SWPL, and data lines DL, which are all connected to the pixels SP. First pixels SP1 may be connected to first data lines DL1, second pixels SP2 to second data lines DL2, and third pixels SP3 to third data lines DL3.

The first scan initialization lines GIL1, the second scan initialization lines GIL2, the first scan write lines GPWL, the second scan write lines GCGL, the emission lines EML, and the sweep lines SWPL extend in an X-axis direction and may be spaced apart from one another in a Y-axis direction intersecting the X-axis direction. The data lines DL extend in the Y-axis direction and may be spaced apart from one another in the X-axis direction.

The pixels SP may include the first pixels SP1, the second pixels SP2, and the third pixels SP3, which emit first light, second light, and third light, respectively. The first light corresponds to, but is not limited to, light in the red wavelength band, the second light corresponds to, but is not limited to, light in the green wavelength band, and the third light corresponds to, but is not limited to, light in the blue wavelength band. For example, the peak wavelength of the first light may be in a range of about 600 nm to about 750 nm, the peak wavelength of the second light may be in a range of about 480 nm to about 560 nm, and the peak wavelength of the third light may be in a range of about 370 nm to about 460 nm.

The first pixels SP1, the second pixels SP2, and the third pixels SP3 may each include a light-emitting element that emits light. The light-emitting element may be an inorganic light-emitting element including a first electrode, a second electrode, and an inorganic semiconductor disposed between the first and second electrodes. For example, the light-emitting element may be a micro-LED including an inorganic semiconductor, but the disclosure is not limited thereto.

A non-display area NDA of the display panel 100 may include the gate driver 110, which supplies signals to the first scan initialization lines GIL1, the second scan initialization lines GIL2, the first scan write lines GPWL, the second scan write lines GCGL, the emission lines EML, and the sweep lines SWPL. For example, the gate driver 110 may be disposed at one or both edges of the non-display area NDA. In another example, the gate driver 110 may be disposed in the display area DA.

The gate driver 110 may receive a gate control signal GCS from the timing controller 300. The gate control signal GCS may include an initialization control signal, a write control signal, a sweep control signal, and an emission control signal.

The gate driver 110 may include an initialization signal output unit 111, a write signal output unit 112, a sweep signal output unit 113, and an emission signal output unit 114.

The initialization signal output unit 111 may receive an initialization control signal from the timing controller 300. The initialization signal output unit 111 may supply a first scan initialization signal to the first scan initialization lines GIL1 and a second scan initialization signal to the second scan initialization lines GIL2 based on the initialization control signal.

The write signal output unit 112 may receive a write control signal from the timing controller 300. The write signal output unit 112 may supply a first scan write signal to the first scan write lines GPWL and a second scan write signal to the second scan write lines GCGL based on the write control signal.

The sweep signal output unit 113 may receive a sweep control signal from the timing controller 300. The sweep signal output unit 113 may supply the sweep signal to the sweep lines SWPL based on the sweep control signal.

The emission signal output unit 114 may receive an emission control signal from the timing controller 300. The emission signal output unit 114 may supply the emission signal to the emission lines EML based on the emission control signal.

The data driver 200 may receive digital video data DATA and a data control signal DCS from the timing controller 300. The data driver 200 may convert the digital video data DATA into analog data voltages and supply the data voltages to the data lines DL. The first pixels SP1, the second pixels SP2, and the third pixels SP3 may be selected by the first and second scan write signals of the gate driver 110. When selected, the first pixels SP1, the second pixels SP2, and the third pixels SP3 may receive the first and second data voltages.

The timing controller 300 may receive the digital video data DATA and a timing signal TS. The timing controller 300 may generate the gate control signal GCS based on the timing signal TS to control the operation timing of the gate driver 110. The timing controller 300 may generate the data control signal DCS based on the timing signal TS to control the operation timing of the data driver 200. The timing controller 300 may supply the digital video data DATA to the data driver 200.

The power supply 400 may generate and supply power voltages to the display panel 100. The power supply 400 may supply a first high potential voltage VDD1, a second high potential voltage VDD2, a first low potential voltage VSS1, a second low potential voltage VSS2, a gate-high voltage VGH, a gate-low voltage VGL, and an initialization voltage VIN to the display panel 100. The first and second high potential voltages VDD1 and VDD2 may be high potential voltages for driving the light-emitting elements of the pixels SP. The first and second low potential voltages VSS1 and VSS2 may be low potential voltages for driving the light-emitting elements of the pixels SP. The initialization voltage VIN may be applied to the pixels SP, and the gate-high voltage VGH and gate-low voltage VGL may be applied to the gate driver 110.

Figure 2:
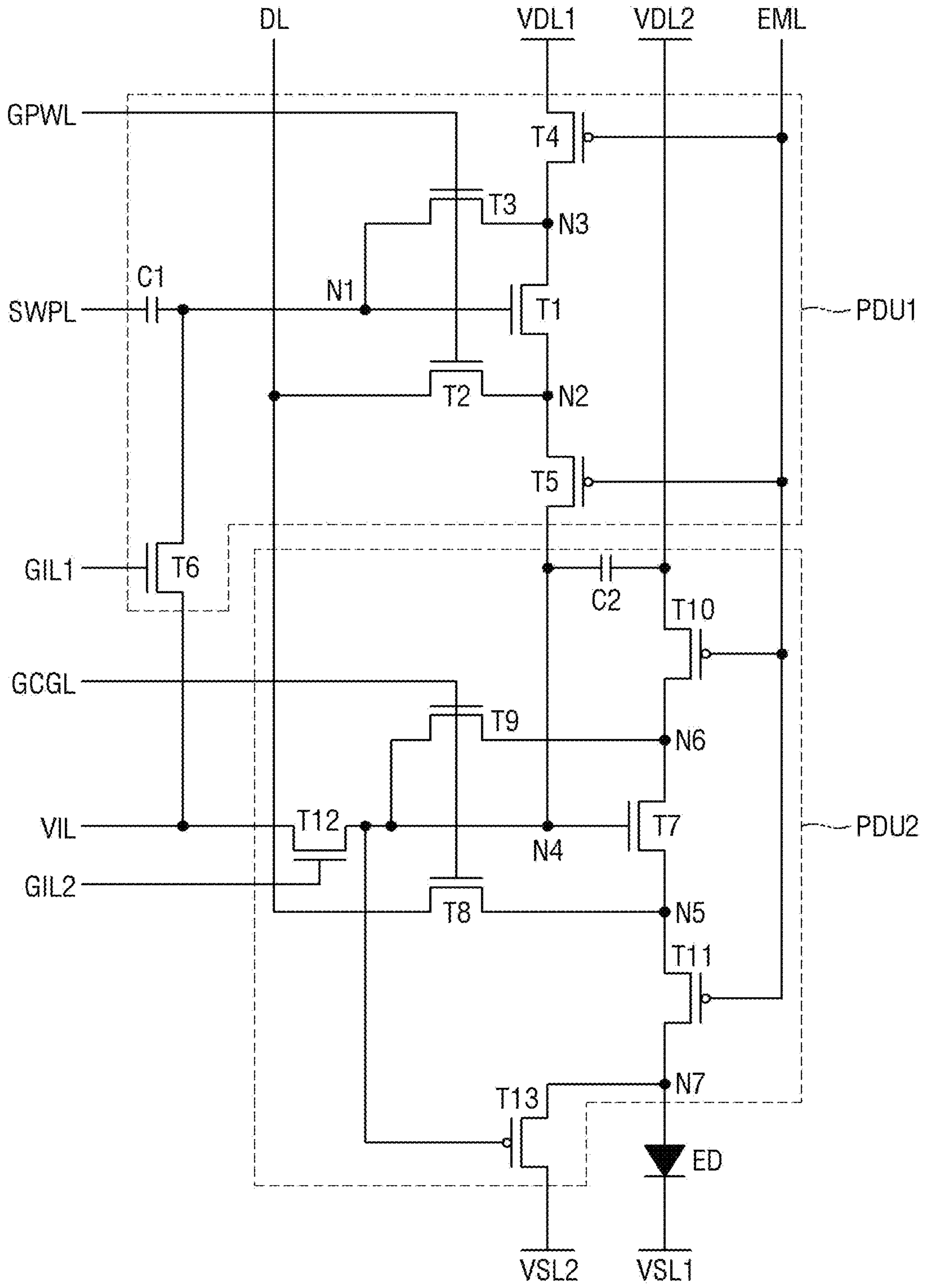
FIG. 2 is a schematic diagram of an equivalent circuit of a pixel according to an embodiment of the disclosure.

FIG. 2 is a schematic diagram of an equivalent circuit of a pixel according to an embodiment of the disclosure.

Referring to FIG. 2, a pixel SP may be connected to a first scan initialization line GIL1, a second scan initialization line GIL2, a first scan write line GPWL, a second scan write line GCGL, an emission line EML, a sweep line SWPL, and a data line DL. Here, the first scan write signal from the first scan write line GPWL may be a scan signal for pulse width modulation (PWM), and the second scan write signal from the second scan write line GCGL may be a scan write signal for constant current generation (CCG). A first data voltage from the data line DL may be a data voltage for PWM, and a second data voltage from the data line DL may be a data voltage for CCG.

The pixel SP may be connected to a first high potential line VDL1 supplying the first high potential voltage VDD1, a second high potential line VDL2 supplying the second high potential voltage VDD2, a first low potential line VSL1 supplying the first low potential voltage VSS1, a second low potential line VSL2 supplying the second low potential voltage VSS2, and an initialization voltage line VIL supplying the initialization voltage VIN.

The pixel SP may include a first pixel driver PDU1, a second pixel driver PDU2, and a light-emitting element ED.

The light-emitting element ED may receive a driving current IED generated by the second pixel driver PDU2 to emit light. The light-emitting element ED may be disposed between a seventh node N7 and the first low potential line VSL1. The first electrode of the light-emitting element ED may be electrically connected to the second electrode of an eleventh transistor T11 and the first electrode of a thirteenth transistor T13 through the seventh node N7. The second electrode of the light-emitting element ED may be electrically connected to the first low potential line VSL1 to receive the first low potential voltage VSS1. The first electrode of the light-emitting element ED may be an anode, and the second electrode may be a cathode. The light-emitting element ED may be an inorganic light-emitting element including a first electrode, a second electrode, and an inorganic semiconductor disposed between the first and second electrodes. For example, the light-emitting element ED may be a micro-LED composed of an inorganic semiconductor, but the disclosure is not limited thereto.

The first pixel driver PDU1 may generate a control current based on the first data voltage from the data line DL to control the voltage of a fourth node N4 of the second pixel driver PDU2. The control current of the first pixel driver PDU1 may adjust the pulse width of the voltage applied to the first electrode of the light-emitting element ED. The first pixel driver PDU1 may perform PWM for the voltage applied to the first electrode of the light-emitting element ED. Therefore, the first pixel driver PDU1 may be a PWM unit.

The first pixel driver PDU1 may include first through sixth transistors T1 through T6 and a first capacitor C1.

The first transistor T1 may control the control current flowing between its first and second electrodes based on the first data voltage applied to its gate electrode, which is a first node N1.

The second transistor T2 may be turned on based on the first scan write signal from the first scan write line GPWL and supply the first data voltage from the data line DL to the first electrode of the first transistor T1, which is a second node N2. The gate electrode of the second transistor T2 may be connected to the first scan write line GPWL, the first electrode of the second transistor T2 may be connected to the data line DL, and the second electrode of the second transistor T2 may be connected to the second node N2.

The third transistor T3 may be turned on based on the first scan write signal from the first scan write line GPWL and electrically connect a third node N3, which is the second electrode of the first transistor T1, to the first node N1. The gate electrode of the third transistor T3 may be connected to the first scan write line GPWL, the first electrode of the third transistor T3 may be connected to the third node N3, and the second electrode of the third transistor T3 may be connected to the first node N1. Therefore, the first transistor T1 may operate as a diode during the period in case that the third transistor T3 is turned on.

The fourth transistor T4 may be turned on based on the emission signal from the emission line EML and supply the first high potential voltage VDD1 to the third node N3. The gate electrode of the fourth transistor T4 may be connected to the emission line EML, the first electrode of the fourth transistor T4 may be connected to the first high potential line VDL1, and the second electrode of the fourth transistor T4 may be connected to the third node N3.

The fifth transistor T5 may be turned on based on the emission signal from the emission line EML and electrically connect the second node N2 to the fourth node N4 of the second pixel driver PDU2. The gate electrode of the fifth transistor T5 may be connected to the emission line EML, the first electrode of the fifth transistor T5 may be connected to the second node N2, and the second electrode of the fifth transistor T5 may be connected to the fourth node N4. Therefore, the fifth transistor T5 may supply the control current to the gate electrode of the seventh transistor T7, which is the fourth node N4, and the seventh transistor T7 may adjust the pulse width of the voltage applied to the first electrode of the light-emitting element ED based on the voltage of the fourth node N4.

The sixth transistor T6 may be turned on based on the first scan initialization signal from the first scan initialization line GIL1 and electrically connect the first node N1 to the initialization voltage line VIL. The gate electrode of the sixth transistor T6 may be connected to the first scan initialization line GIL1, the first electrode of the sixth transistor T6 may be connected to the first node N1, and the second electrode of the sixth transistor T6 may be connected to the initialization voltage line VIL.

The first capacitor C1 may be connected between the first node N1 and the sweep line SWPL. The first capacitor electrode of the first capacitor C1 may be connected to the first node N1, and the second capacitor electrode of the first capacitor C1 may be connected to the sweep line SWPL. The first capacitor C1 may maintain the potential difference between the first node N1 and the sweep line SWPL.

The second pixel driver PDU2 may generate the driving current IED supplied to the light-emitting element ED based on the second data voltage from the data line DL. The second pixel driver PDU2 may receive the second data voltage, which is a constant voltage, and generate a constant current supplied to the light-emitting element ED regardless of the luminance of the pixel SP. Therefore, the second pixel driver PDU2 may be a CCG unit.

The second pixel driver PDU2 may include seventh through thirteenth transistors T7 through T13 and a second capacitor C2.

The seventh transistor T7 may control the driving current IED flowing between its first and second electrodes based on the second data voltage applied to its gate electrode, which is the fourth node N4. The seventh transistor T7 may control the period during which the driving current IED flows through the light-emitting element ED.

The eighth transistor T8 may be turned on based on the second scan write signal from the second scan write line GCGL and supply the second data voltage from the data line DL to a fifth node N5, which is the first electrode of the seventh transistor T7. The gate electrode of the eighth transistor T8 may be connected to the second scan write line GCGL, the first electrode of the eighth transistor T8 may be connected to the data line DL, and the second electrode of the eighth transistor T8 may be connected to the fifth node N5.

The ninth transistor T9 may be turned on based on the second scan write signal from the second scan write line GCGL and electrically connect a sixth node N6, which is the second electrode of the seventh transistor T7, to the fourth node N4. The gate electrode of the ninth transistor T9 may be connected to the second scan write line GCGL, the first electrode of the ninth transistor T9 may be connected to the sixth node N6, and the second electrode of the ninth transistor T9 may be connected to the fourth node N4. Therefore, the seventh transistor T7 may operate as a diode during the period in case that the ninth transistor T9 is turned on.

The tenth transistor T10 may be turned on based on the emission signal from the emission line EML and supply the second high potential voltage VDD2 to the sixth node N6. The gate electrode of the tenth transistor T10 may be connected to the emission line EML, the first electrode of the tenth transistor T10 may be connected to the second high potential line VDL2, and the second electrode of the tenth transistor T10 may be connected to the sixth node N6.

The eleventh transistor T11 may be turned on based on the emission signal from the emission line EML and electrically connect the fifth node N5 to the seventh node N7, which is the first electrode of the light-emitting element ED. The gate electrode of the eleventh transistor T11 may be connected to the emission line EML, the first electrode of the eleventh transistor T11 may be connected to the fifth node N5, and the second electrode of the eleventh transistor T11 may be connected to the seventh node N7.

The twelfth transistor T12 may be turned on based on the second scan initialization signal from the second scan initialization line GIL2 and electrically connect the fourth node N4 to the initialization voltage line VIL. The gate electrode of the twelfth transistor T12 may be connected to the second scan initialization line GIL2, the first electrode of the twelfth transistor T12 may be connected to the fourth node N4, and the second electrode of the twelfth transistor T12 may be connected to the initialization voltage line VIL.

The thirteenth transistor T13 may electrically connect the seventh node N7, which is the first electrode of the light-emitting element ED, to the second low potential line VSL2 based on the voltage of the fourth node N4. During the period in case that the thirteenth transistor T13 is turned on, the seventh node N7 may be discharged to the second low potential voltage VSS2. The gate electrode of the thirteenth transistor T13 may be connected to the fourth node N4, the first electrode of the thirteenth transistor T13 may be connected to the seventh node N7, and the second electrode of the thirteenth transistor T13 may be connected to the second low potential line VSL2.

The second capacitor C2 may be connected between the fourth node N4 and the second high potential line VDL2. The first capacitor electrode of the second capacitor C2 may be connected to the fourth node N4, and the second capacitor electrode of the second capacitor C2 may be connected to the second high potential line VDL2. The second capacitor C2 may maintain the potential difference between the fourth node N4 and the second high potential line VDL2.

The first through third, sixth through ninth, and twelfth transistors T1 through T3, T6 through T9, and T12 may each include an oxide-based semiconductor layer. The first through third, sixth through ninth, and twelfth transistors T1 through T3, T6 through T9, and T12 may be implemented as N-type metal-oxide semiconductor field-effect transistors (MOSFETs) and may be turned on based on a gate voltage with a gate-high level. The first through third, sixth through ninth, and twelfth transistors T1 through T3, T6 through T9, and T12 may each have a coplanar structure where the gate electrode is disposed on top of the oxide-based semiconductor layer, but the disclosure is not limited thereto. The first through third, sixth through ninth, and twelfth transistors T1 through T3, T6 through T9, and T12 may have a smaller S-factor compared to transistors with a polysilicon-based semiconductor layer. For example, the seventh transistor T7 may have a relatively small S-factor, increasing the constant current driving area in the low grayscale region and improving the expression of low grayscale. The seventh transistor T7 may maintain an off-state in the peak black gradation and has excellent off-current characteristics, improving the expression of peak black gradation. Therefore, the seventh transistor T7 can prevent leakage current from being supplied to the light-emitting element ED and can stably maintain the voltage in the circuit of the pixel SP.

The fourth, fifth, tenth, eleventh, and thirteenth transistors T4, T5, T10, T11, and T13 may each include a polysilicon- or amorphous silicon-based semiconductor layer. The fourth, fifth, tenth, eleventh, and thirteenth transistors T4, T5, T10, T11, and T13 may be implemented as P-type MOSFETs and may be turned on based on a gate voltage with a gate-low level. In case that the semiconductor layer of each of the fourth, fifth, tenth, eleventh, and thirteenth transistors T4, T5, T10, T11, and T13 may include polysilicon, it may be formed by a low-temperature polysilicon (LTPS) process. The fourth, fifth, tenth, eleventh, and thirteenth transistors T4, T5, T10, T11, and T13 may each include a LTPS-based semiconductor layer, having high electron mobility and excellent turn-on characteristics.

The disclosure is not limited to the illustration in FIG. 2. By way of example, at least one of the first through third, sixth through ninth, and twelfth transistors T1 through T3, T6 through T9, and T12 may include a silicon-based semiconductor layer, and at least one of the fourth, fifth, tenth, eleventh, and thirteenth transistors T4, T5, T10, T11, and T13 may include an oxide-based semiconductor layer.

Figure 3:
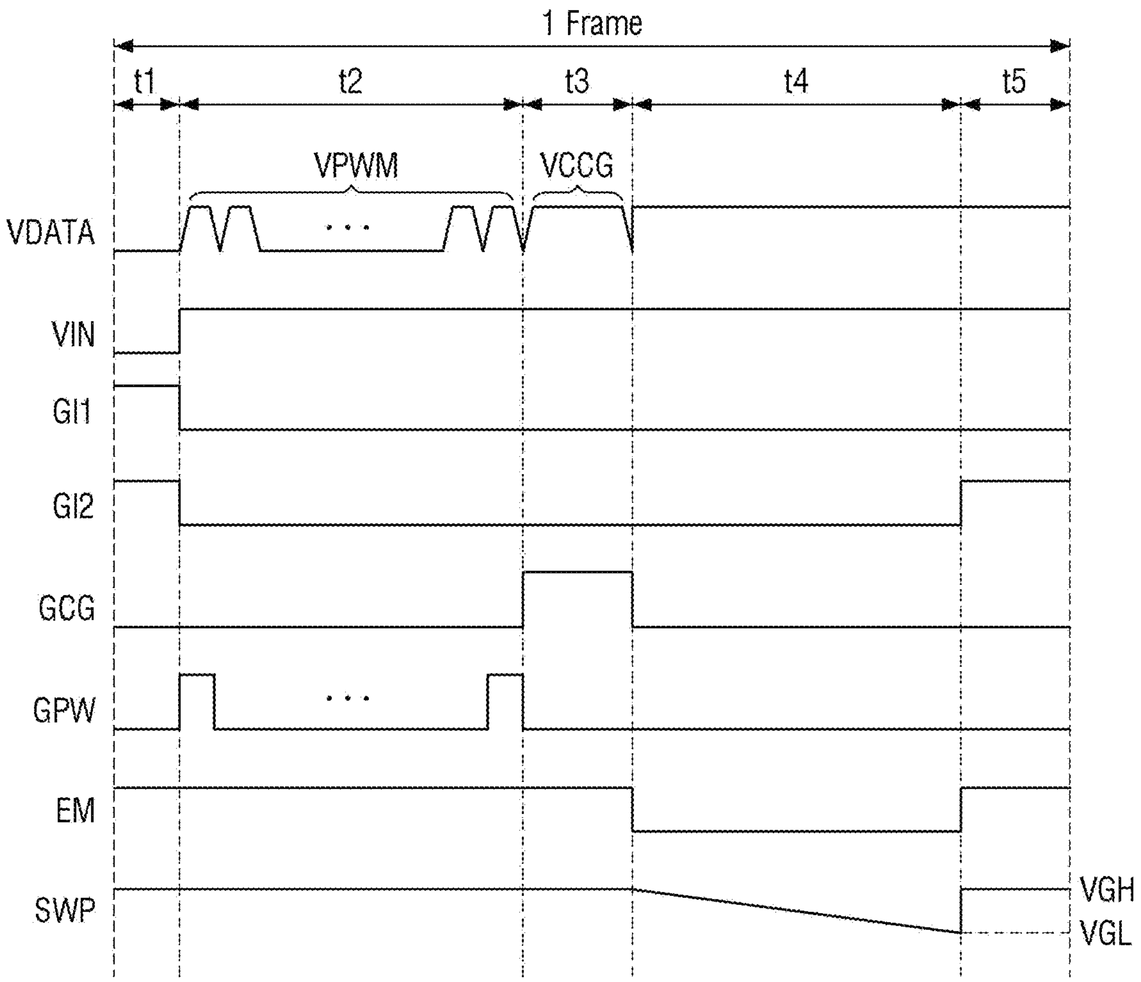
FIG. 3 is a waveform diagram illustrating signals applied to the pixel according to the embodiment of FIG. 2.

FIG. 3 is a waveform diagram illustrating signals applied to the pixel according to the embodiment of FIG. 2.

Referring to FIG. 3, the pixel SP may be connected to the first scan initialization line GIL1, the second scan initialization line GIL2, the first scan write line GPWL, the second scan write line GCGL, the emission line EML, the sweep line SWPL, and a data line DL.

The first scan initialization line GIL1 may supply a high-level first scan initialization signal GI1 during a first period t1 of one frame period. The second scan initialization line GIL2 may supply a high-level second scan initialization signal GI2 during the first period t1 and a fifth period t5. The first scan write line GPWL may supply a high-level first scan write signal GPW during a second period t2. The second scan write line GCGL may supply a high-level second scan write signal GCG during a third period t3. The emission line EML may supply a low-level emission signal EM during a fourth period t4. The sweep line SWPL may supply a sweep signal SWP during the fourth period t4. The sweep signal SWP may have a pulse that linearly decreases from the gate-high voltage VGH to the gate-low voltage VGL. A data voltage VDATA from the data line DL may be a first data voltage VPWM during the second period t2, and a second data voltage VCCG during the third period t3.

Figure 4:
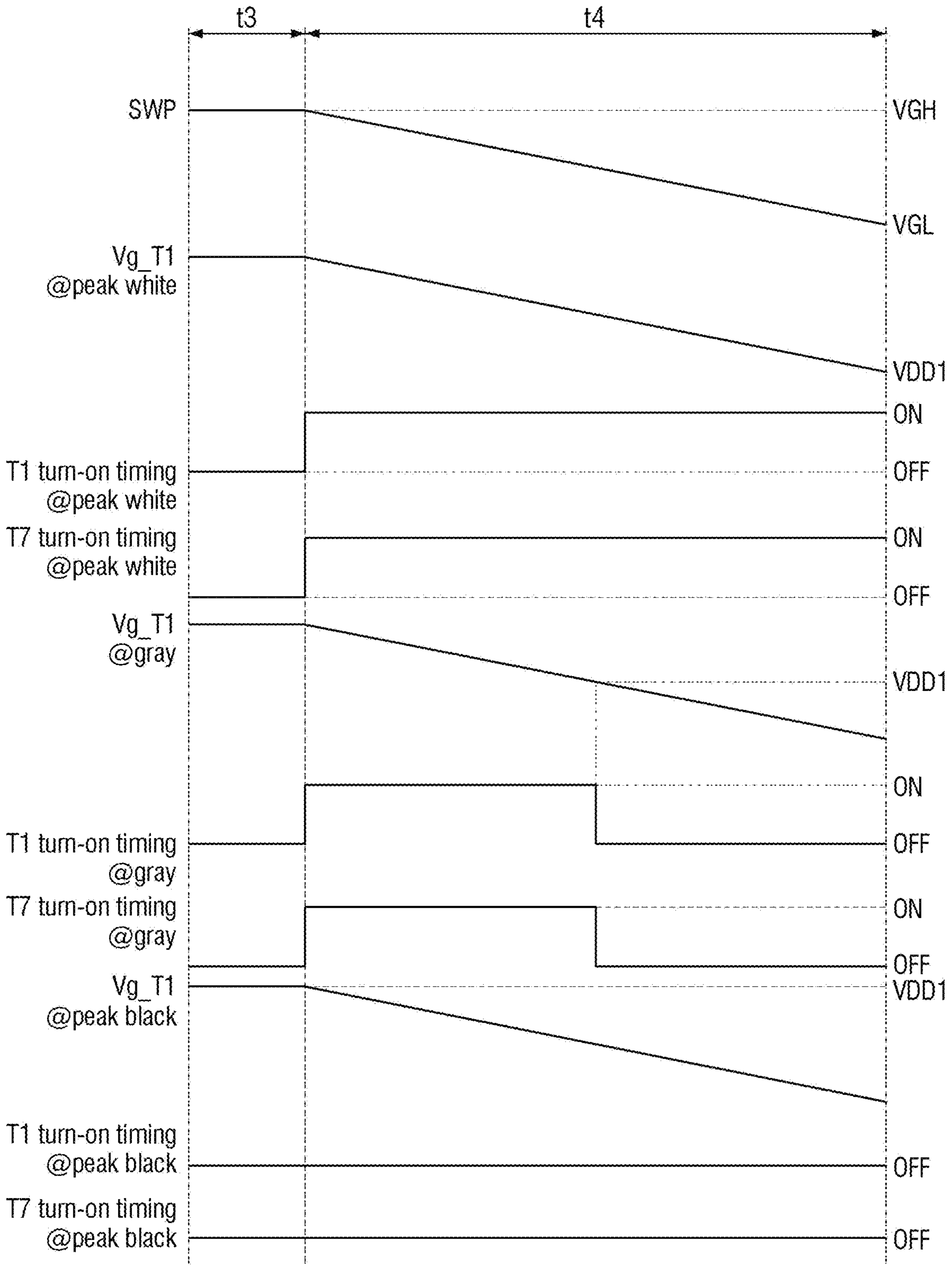
FIG. 4 is a timing diagram illustrating the turn-on timings of first and seventh transistors during the third and fourth periods of FIG. 3.

FIG. 4 is a timing diagram illustrating the turn-on timings of the first and seventh transistors during the third and fourth periods of FIG. 3.

Referring to FIG. 4, in case that the first data voltage VPWM has the value for peak white gradation, a voltage Vg_T1 of the gate electrode of the first transistor T1 may have a voltage greater than the first high potential voltage VDD1 during the third period t3 and may decrease following the sweep signal SWP during the fourth period t4. The voltage Vg_T1 of the gate electrode of the first transistor T1 can decrease from a voltage greater than the first high potential voltage VDD1 to the first high potential voltage VDD1 during the fourth period t4. As a gate-source voltage (Vgs=Vg_T1−VDD1) of the first transistor T1 may be greater than a threshold voltage during the fourth period t4, the first transistor T1 may be turned on throughout the fourth period t4. The control current of the first transistor T1 may be supplied to the fourth node N4 throughout the fourth period t4, and the seventh transistor T7 may be turned on throughout the fourth period t4. The driving current IED may be applied to the light-emitting element ED throughout the fourth period t4, and the light-emitting element ED may emit light throughout the fourth period t4.

In case that the first data voltage VPWM is a gray gradation data voltage, the voltage Vg_T1 of the gate electrode of the first transistor T1 may have a voltage greater than the first high potential voltage VDD1 during the third period t3 and may decrease following the sweep signal SWP during the fourth period t4. The voltage Vg_T1 of the gate electrode of the first transistor T1 may decrease from a voltage greater than the first high potential voltage VDD1 to a voltage less than the first high potential voltage VDD1 during the fourth period t4. The first transistor T1 may be turned on during the first half of the fourth period t4 as the voltage of the sweep signal SWP decreases. Here, the length of the first half of the fourth period t4 may change according to the value of the first data voltage VPWM. The control current of the first transistor T1 may flow to the fourth node N4 during the first half of the fourth period t4, and the voltage of the fourth node N4 may be at a gate-on level during the first half of the fourth period t4. Therefore, the seventh transistor T7 may be turned on during the first half of the fourth period t4. The driving current IED may be applied to the light-emitting element ED during the first half of the fourth period t4 and may not be applied to the light-emitting element ED during the second half of the fourth period t4. Therefore, the light-emitting element ED may emit light during the first half of the fourth period t4.

In case that the first data voltage VPWM is a data voltage for peak black gradation, the voltage Vg_T1 of the gate electrode of the first transistor T1 may be the first high potential voltage VDD1 during the third period t3 and may decrease following the sweep signal SWP during the fourth period t4. The gate-source voltage (Vgs=Vg_T1−VDD1) of the first transistor T1 may be less than the threshold voltage during the fourth period t4, and the first transistor T1 may be turned off throughout the fourth period t4. The control current of the first transistor T1 may not be supplied to the fourth node N4 throughout the fourth period t4, and the seventh transistor T7 may be turned off throughout the fourth period t4. Therefore, the driving current IED may not be applied to the light-emitting element ED throughout the fourth period t4, and the light-emitting element ED may not emit light throughout the fourth period t4.

By adjusting the first data voltage VPWM applied to the gate electrode of the first transistor T1 as described above, the emission period of the light-emitting element ED can be adjusted. Therefore, by uniformly maintaining the magnitude of the driving current IED applied to the light-emitting element ED and adjusting the pulse width of the voltage applied to the first electrode of the light-emitting element ED, the gradation or luminance displayed by the pixel SP can be adjusted.

For example, in case that the digital video data DATA to be converted into a data voltage is 8-bit data, the data voltage for peak black gradation may be 0, and the data voltage for peak white gradation may be 255. The data voltages for gray gradation may be data other than 0 and 255.

In FIG. 4, ON refers to the turn-on of the first transistor T1 or the seventh transistor T7. Also, OFF refers to the turn-off of the first transistor T1 or the seventh transistor T7.

Figure 5:
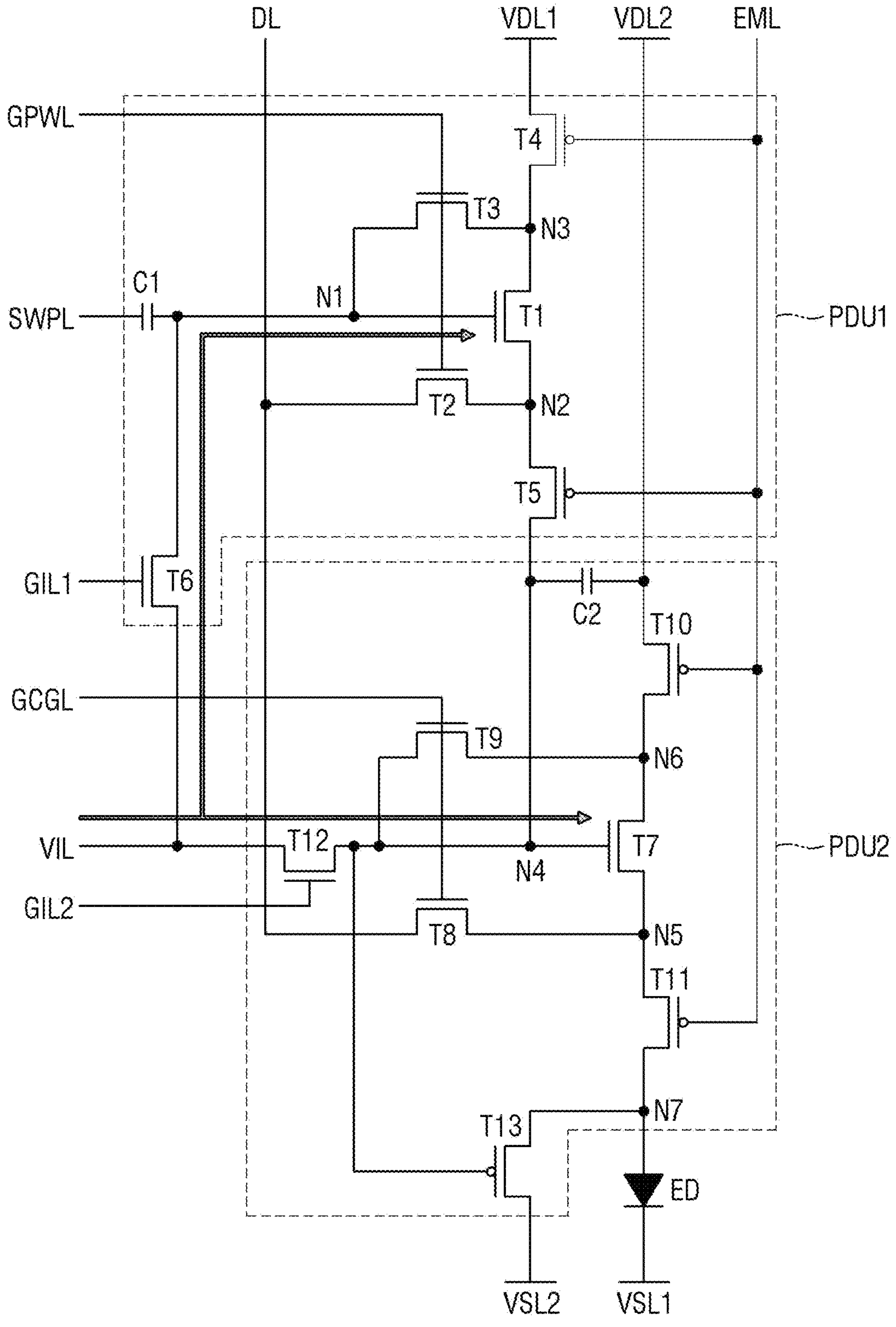
FIG. 5 is a schematic circuit diagram illustrating the operation of the pixel during the first period, in the display device of FIG. 2.

FIG. 5 is a schematic circuit diagram illustrating the operation of the pixel during the first period, in the display device of FIG. 2.

Referring to FIG. 5 and further to FIG. 3, the sixth transistor T6 may be turned on based on the first scan initialization signal GI1 during the first period t1, and the twelfth transistor T12 may be turned on based on the second scan initialization signal GI2 during the first period t1. The sixth transistor T6 may discharge the first node N1, which is the gate electrode of the first transistor T1, to the initialization voltage VIN, and the twelfth transistor T12 may discharge the fourth node N4, which is the gate electrode of the seventh transistor T7, to the initialization voltage VIN.

Figure 6:
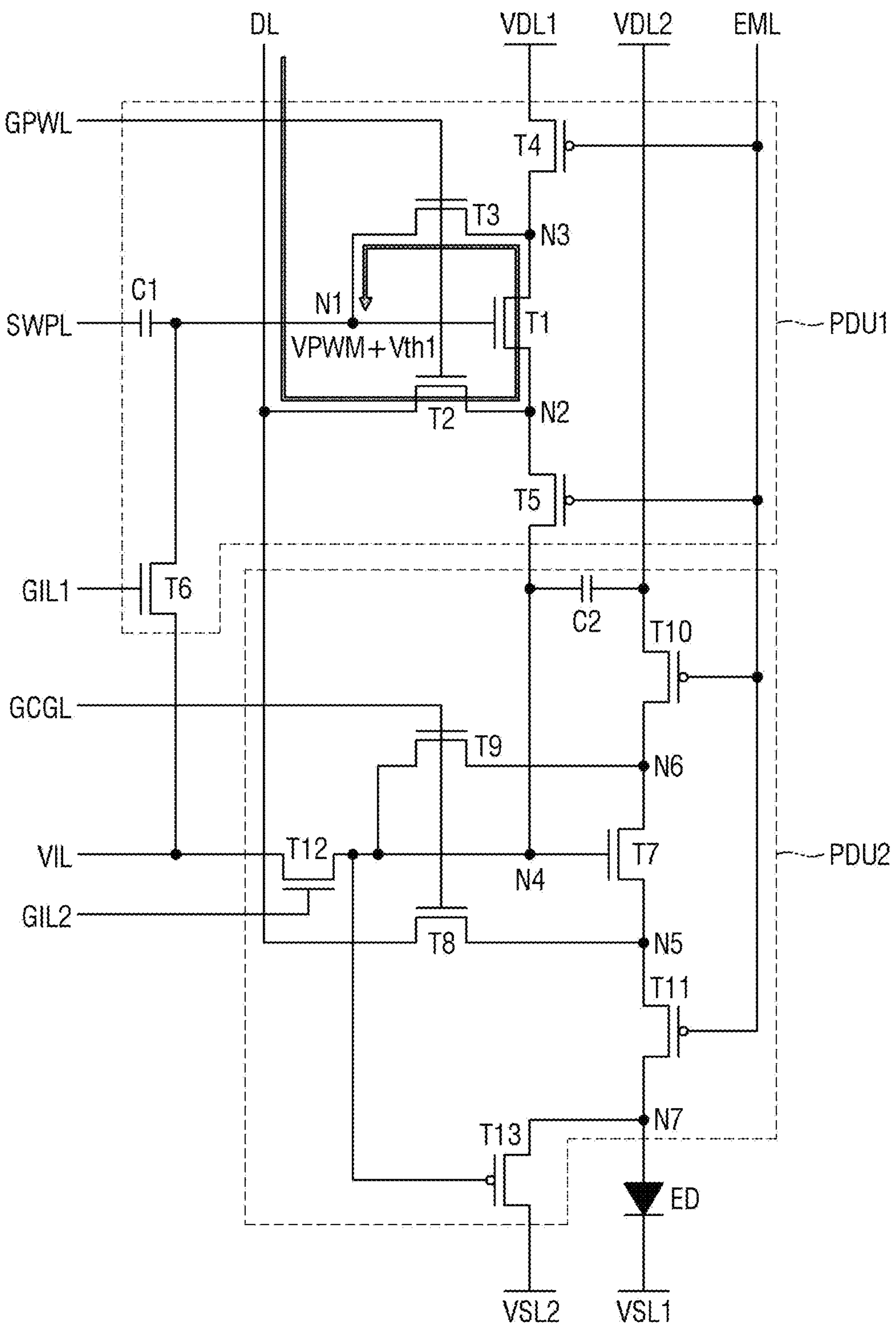
FIG. 6 is a schematic circuit diagram illustrating the operation of the pixel during the second period, in the display device of FIG. 2.

FIG. 6 is a schematic circuit diagram illustrating the operation of the pixel during the second period, in the display device of FIG. 2.

Referring to FIG. 6 and further to FIG. 3, the second and third transistors T2 and T3 may be turned on based on the first scan write signal GPW during the second period t2. The first data voltage VPWM may be supplied to the second node N2, which is the first electrode of the first transistor T1, through the second transistor T2. In this case, the gate-source voltage of the first transistor T1 may be greater than a threshold voltage of the first transistor T1, and the first transistor T1 may be turned on. As the third transistor T3 is turned on, the third node N3, which is the second electrode of the first transistor T1, and the first node N1, which is the gate electrode of the first transistor T1, may be electrically connected, and the first transistor T1 may operate as a diode. The first transistor T1 may be turned on until the gate-source voltage reaches the threshold voltage. Therefore, the voltage of the first node N1, which is the gate electrode of the first transistor T1, may rise from "VIN" to "VPWM+Vth1." Vth1 refers to a threshold voltage of the first transistor T1. For example, in case that the first transistor T1 is implemented as an N-type MOSFET, the threshold voltage of the first transistor T1 may be greater than 0V, but the disclosure is not limited to this.

Figure 7:
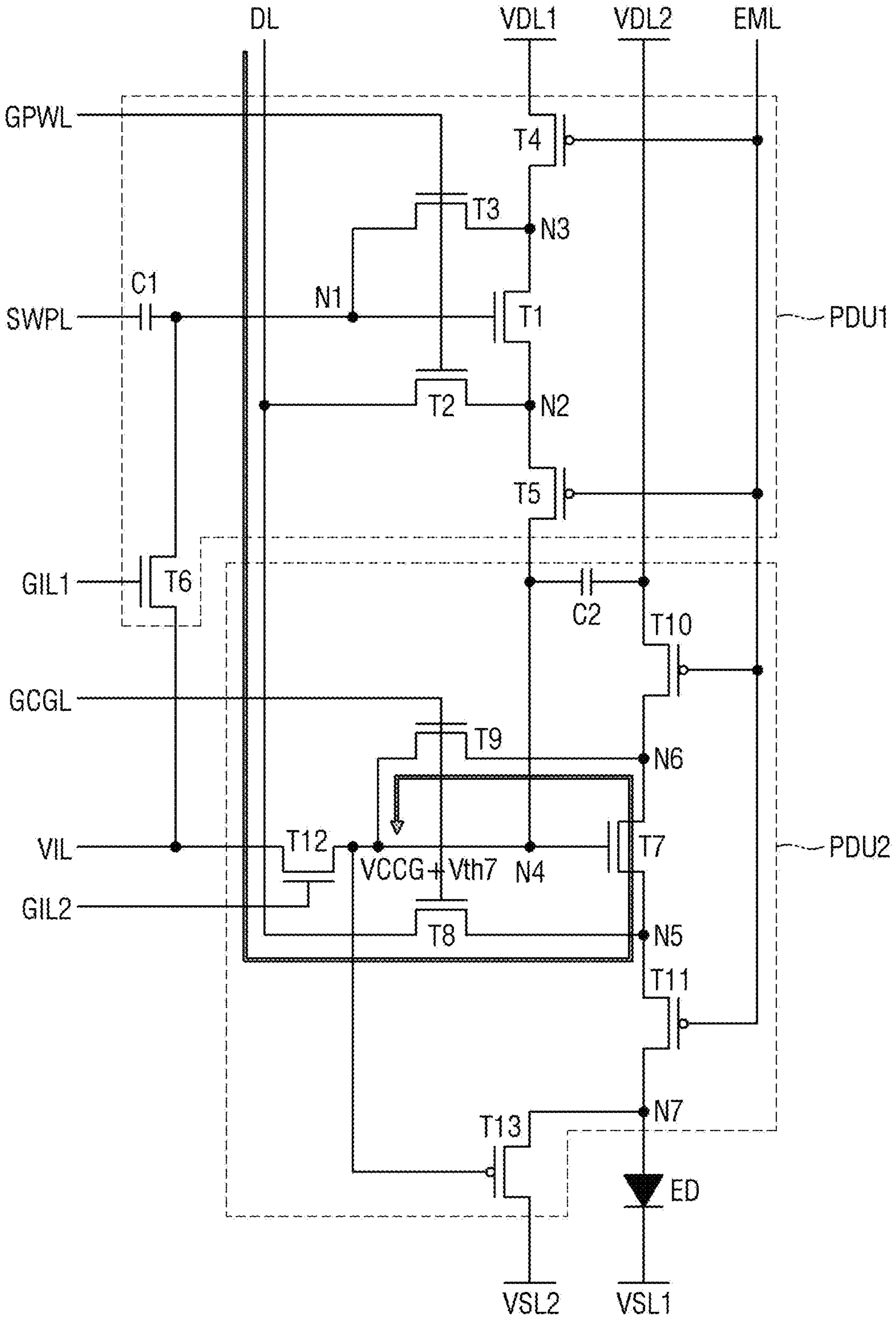
FIG. 7 is a schematic circuit diagram illustrating the operation of the pixel during the third period, in the display device of FIG. 2.

FIG. 7 is a schematic circuit diagram illustrating the operation of the pixel during the third period, in the display device of FIG. 2.

Referring to FIG. 7 and further to FIG. 3, the eighth and ninth transistors T8 and T9 may be turned on based on the second scan write signal GCG during the third period t3. The second data voltage VCCG may be supplied to the fifth node N5, which is the first electrode of the seventh transistor T7, through the eighth transistor T8. In this case, the gate-source voltage of the seventh transistor T7 may be greater than a threshold voltage of the seventh transistor T7, and the seventh transistor T7 can be turned on. As the ninth transistor T9 is turned on, the sixth node N6, which is the second electrode of the seventh transistor T7, and the fourth node N4, which is the gate electrode of the seventh transistor T7, may be electrically connected, and the seventh transistor T7 may operate as a diode. The seventh transistor T7 may be turned on until the gate-source voltage reaches the threshold voltage. Therefore, the voltage of the fourth node N4, which is the gate electrode of the seventh transistor T7, may rise from "VIN" to "VCCG+Vth7." Vth7 refers to a threshold voltage of the seventh transistor T7. For example, in case that the seventh transistor T7 is implemented as an N-type MOSFET, the threshold voltage of the seventh transistor T7 may be greater than 0V, but the disclosure is not limited thereto.

Figure 8:
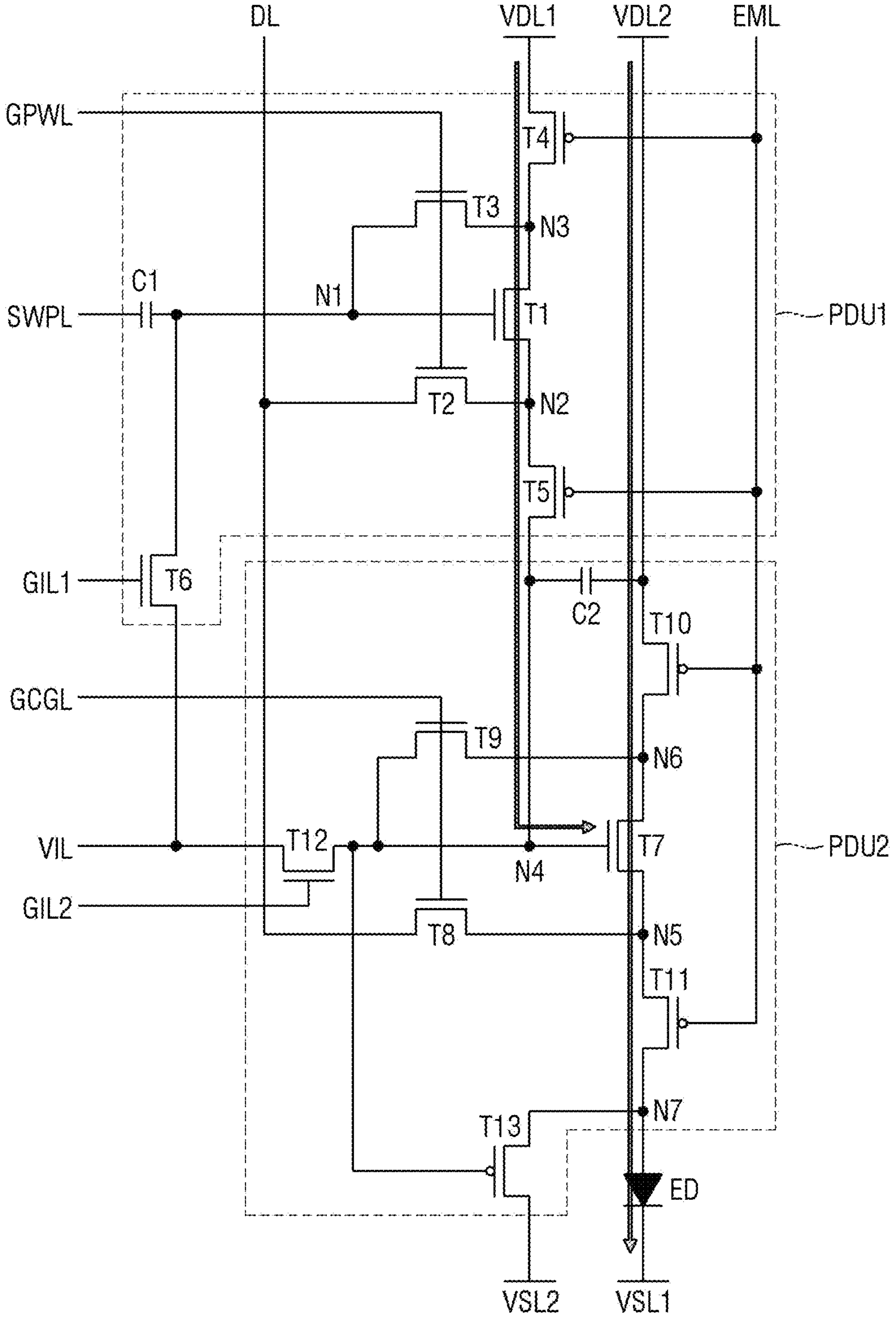
FIG. 8 is a schematic circuit diagram illustrating the operation of the pixel during the fourth period, in the display device of FIG. 2.

FIG. 8 is a schematic circuit diagram illustrating the operation of the pixel during the fourth period, in the display device of FIG. 2.

Referring to FIG. 8 and further to FIG. 3, the fourth, fifth, tenth, and eleventh transistors T4, T5, T10, and T11 may be turned on based on the emission signal EM during the fourth period t4.

As illustrated in FIG. 4, in case that the first data voltage VPWM has the value for peak white gradation, the first transistor T1 may remain turned on throughout the fourth period t4, supplying the control current to the fourth node N4, and the seventh transistor T7 may remain turned on throughout the fourth period t4. Therefore, the driving current IED may be applied to the light-emitting element ED throughout the fourth period t4, and the light-emitting element ED may emit light throughout the fourth period t4.

In case that the first data voltage VPWM is a gray gradation data voltage, the control current of the first transistor T1 may flow to the fourth node N4 during the first half of the fourth period t4, and the voltage of the fourth node N4 may be at the gate-on level during the first half of the fourth period t4. Here, the length of the first half of the fourth period t4 may change according to the value of the first data voltage VPWM. Therefore, the seventh transistor T7 may be turned on during the first half of the fourth period t4. The driving current IED may be applied to the light-emitting element ED during the first half of the fourth period t4 and may not be applied to the light-emitting element ED during the second half of the fourth period t4. Therefore, the light-emitting element ED may emit light during the first half of the fourth period t4.

In case that the first data voltage VPWM is the data voltage for peak black gradation, the first transistor T1 may remain turned off throughout the fourth period t4, and the control current may not be supplied to the fourth node N4 throughout the fourth period t4. The seventh transistor T7 may remain turned off throughout the fourth period t4. Therefore, the driving current IED may not be applied to the light-emitting element ED throughout the fourth period t4, and the light-emitting element ED may not emit light throughout the fourth period t4.

Figure 9:
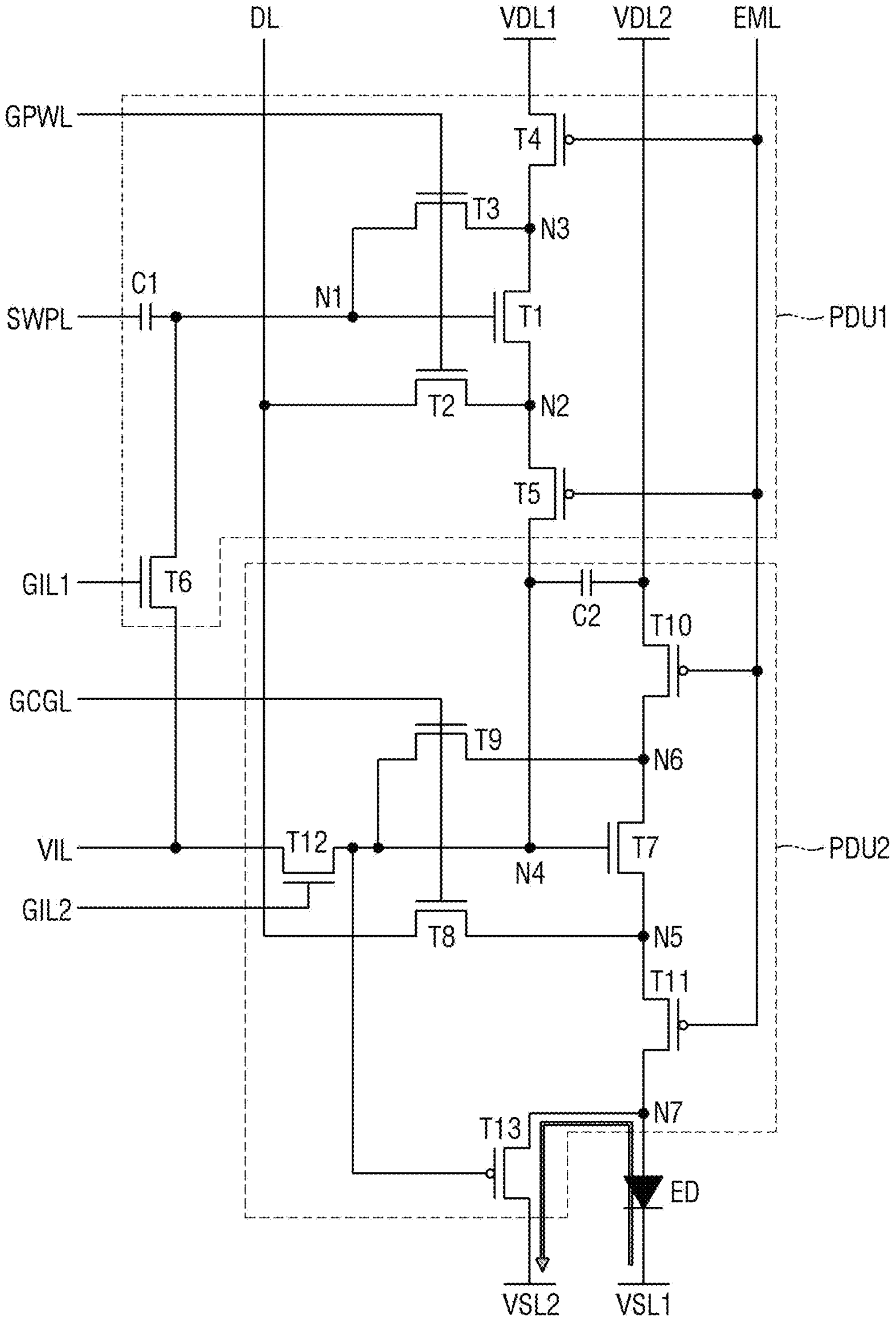
FIG. 9 is a schematic circuit diagram illustrating the operation of the pixel during the fifth period, in the display device of FIG. 2.

FIG. 9 is a schematic circuit diagram illustrating the operation of the pixel during the fifth period, in the display device of FIG. 2.

Referring to FIG. 9 and further to FIG. 3, the thirteenth transistor T13 may be turned on based on the voltage of the fourth node N4 during the fifth period t5. The twelfth transistor T12 may be turned on based on the second scan initialization signal GI2 during the fifth period t5, discharging the fourth node N4 to the initialization voltage VIN. Therefore, the thirteenth transistor T13 may discharge the seventh node N7, which is the first electrode of the light-emitting element ED, to the second low potential voltage VSS2.

As the display device 10 may include the pixel circuit consisting of the first through thirteenth transistors T1 through T13, the display device 10 can reduce the number of transistors and signal lines compared to a conventional pixel circuit including a PWM unit and a CCG unit. Therefore, the display device 10 can reduce power consumption, facilitate variable frequency driving, and improve the expression of peak black gradation.

Figure 10:
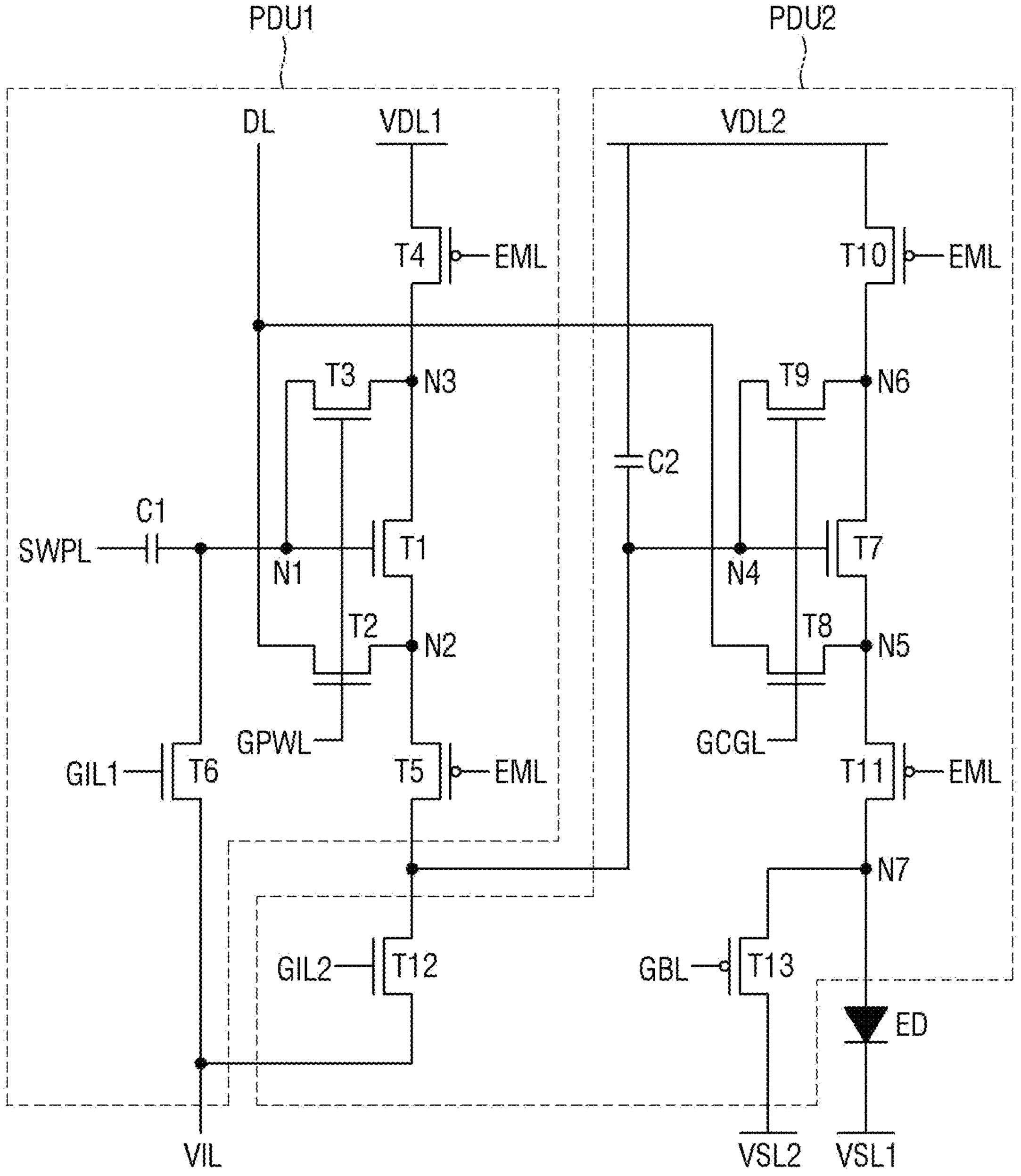
FIG. 10 is a schematic diagram of an equivalent circuit of a pixel according to an embodiment of the disclosure.

FIG. 10 is a schematic diagram of an equivalent circuit of a pixel according to an embodiment of the disclosure.

Referring to FIG. 10, a pixel SP may be connected to a first scan initialization line GIL1, a second scan initialization line GIL2, a first scan write line GPWL, a second scan write line GCGL, an anode initialization line GBL, an emission line EML, a sweep line SWPL, and a data line DL. A first data voltage from the data line DL may be a data voltage for PWM, and a second data voltage from the data line DL may be a data voltage for CCG.

The pixel SP may be connected to a first high potential line VDL1 supplying a first high potential voltage VDD1, a second high potential line VDL2 supplying a second high potential voltage VDD2, a first low potential line VSL1 supplying a first low potential voltage VSS1, a second low potential line VSL2 supplying a second low potential voltage VSS2, and an initialization voltage line VIL supplying an initialization voltage VIN.

The pixel SP may include a first pixel driver PDU1, a second pixel driver PDU2, and a light-emitting element ED.

The light-emitting element ED may receive a driving current IED generated by the second pixel driver PDU2 to emit light. The light-emitting element ED may be disposed between a seventh node N7 and the first low potential line VSL1. The first electrode of the light-emitting element ED may be electrically connected to the second electrode of the eleventh transistor T11 and the first electrode of the thirteenth transistor T13 through the seventh node N7. The second electrode of the light-emitting element ED may be electrically connected to the first low potential line VSL1 to receive the first low potential voltage VSS1. The first electrode of the light-emitting element ED may be an anode, and the second electrode of the light-emitting element ED may be a cathode. The light-emitting element ED may be an inorganic light-emitting element including a first electrode, a second electrode, and an inorganic semiconductor disposed between the first and second electrodes. For example, the light-emitting element ED may be a micro-LED composed of an inorganic semiconductor, but the disclosure is not limited thereto.

The first pixel driver PDU1 may generate a control current based on the first data voltage from the data line DL to control the voltage of a fourth node N4 of the second pixel driver PDU2. The control current of the first pixel driver PDU1 may adjust the pulse width of the voltage applied to the first electrode of the light-emitting element ED. The first pixel driver PDU1 may perform PWM for the voltage applied to the first electrode of the light-emitting element ED. Therefore, the first pixel driver PDU1 may be a PWM unit.

The first pixel driver PDU1 may include first through sixth transistors T1 through T6 and a first capacitor C1.

The first transistor T1 may control the control current flowing between its first and second electrodes based on the first data voltage applied to its gate electrode, which is a first node N1.

The second transistor T2 may be turned on based on a first scan write signal from the first scan write line GPWL and supply the first data voltage from the data line DL to the first electrode of the first transistor T1, which is a second node N2. The gate electrode of the second transistor T2 may be connected to the first scan write line GPWL, the first electrode of the second transistor T2 may be connected to the data line DL, and the second electrode of the second transistor T2 may be connected to the second node N2.

The third transistor T3 may be turned on based on the first scan write signal from the first scan write line GPWL and electrically connect a third node N3, which is the second electrode of the first transistor T1, to the first node N1. The gate electrode of the third transistor T3 may be connected to the first scan write line GPWL, the first electrode of the third transistor T3 may be connected to the third node N3, and the second electrode of the third transistor T3 may be connected to the first node N1. Therefore, the first transistor T1 may operate as a diode during the period in case that the third transistor T3 is turned on.

The fourth transistor T4 may be turned on based on an emission signal from the emission line EML and supply the first high potential voltage VDD1 to the third node N3. The gate electrode of the fourth transistor T4 may be connected to the emission line EML, the first electrode of the fourth transistor T4 may be connected to the first high potential line VDL1, and the second electrode of the fourth transistor T4 may be connected to the third node N3.

The fifth transistor T5 may be turned on based on the emission signal from the emission line EML and electrically connect the second node N2 to the fourth node N4 of the second pixel driver PDU2. The gate electrode of the fifth transistor T5 may be connected to the emission line EML, the first electrode of the fifth transistor T5 may be connected to the second node N2, and the second electrode of the fifth transistor T5 may be connected to the fourth node N4. Therefore, the fifth transistor T5 may supply the control current to the gate electrode of the seventh transistor T7, which is the fourth node N4, and the seventh transistor T7 may adjust the pulse width of the voltage applied to the first electrode of the light-emitting element ED based on the voltage of the fourth node N4.

The sixth transistor T6 may be turned on based on a first scan initialization signal from the first scan initialization line GIL1 and electrically connect the first node N1 to the initialization voltage line VIL. The gate electrode of the sixth transistor T6 may be connected to the first scan initialization line GIL1, the first electrode of the sixth transistor T6 may be connected to the first node N1, and the second electrode of the sixth transistor T6 may be connected to the initialization voltage line VIL.

The first capacitor C1 may be connected between the first node N1 and the sweep line SWPL. The first capacitor electrode of the first capacitor C1 may be connected to the first node N1, and the second capacitor electrode may be connected to the sweep line SWPL. The first capacitor C1 may maintain the potential difference between the first node N1 and the sweep line SWPL.

The second pixel driver PDU2 may generate the driving current IED supplied to the light-emitting element ED based on the second data voltage from the data line DL. The second pixel driver PDU2 may receive the second data voltage, which is a constant voltage, and generate a constant current supplied to the light-emitting element ED regardless of the luminance of the pixel SP. Therefore, the second pixel driver PDU2 may be a CCG unit.

The second pixel driver PDU2 may include seventh through thirteenth transistors T7 through T13 and a second capacitor C2.

The seventh transistor T7 may control the driving current IED flowing between its first and second electrodes based on the second data voltage applied to its gate electrode, which is the fourth node N4. The seventh transistor T7 may control the period during which the driving current IED flows through the light-emitting element ED.

The eighth transistor T8 may be turned on based on a second scan write signal from the second scan write line GCGL and supply the second data voltage from the data line DL to a fifth node N5, which is the first electrode of the seventh transistor T7. The gate electrode of the eighth transistor T8 may be connected to the second scan write line GCGL, the first electrode of the eighth transistor T8 may be connected to the data line DL, and the second electrode of the eighth transistor T8 may be connected to the fifth node N5.

The ninth transistor T9 may be turned on based on the second scan write signal from the second scan write line GCGL and electrically connect a sixth node N6, which is the second electrode of the seventh transistor T7, to the fourth node N4. The gate electrode of the ninth transistor T9 may be connected to the second scan write line GCGL, the first electrode of the ninth transistor T9 may be connected to the sixth node N6, and the second electrode of the ninth transistor T9 may be connected to the fourth node N4. Therefore, the seventh transistor T7 may operate as a diode during the period in case that the ninth transistor T9 is turned on.

The tenth transistor T10 may be turned on based on the emission signal from the emission line EML and supply the second high potential voltage VDD2 to the sixth node N6. The gate electrode of the tenth transistor T10 may be connected to the emission line EML, the first electrode of the tenth transistor T10 may be connected to the second high potential line VDL2, and the second electrode of the tenth transistor T10 may be connected to the sixth node N6.

The eleventh transistor T11 may be turned on based on the emission signal from the emission line EML and electrically connect the fifth node N5 to the seventh node N7, which is the first electrode of the light-emitting element ED. The gate electrode of the eleventh transistor T11 may be connected to the emission line EML, the first electrode of the eleventh transistor T11 may be connected to the fifth node N5, and the second electrode of the eleventh transistor T11 may be connected to the seventh node N7.

The twelfth transistor T12 may be turned on based on the second scan initialization signal from the second scan initialization line GIL2 and electrically connect the fourth node N4 to the initialization voltage line VIL. The gate electrode of the twelfth transistor T12 may be connected to the second scan initialization line GIL2, the first electrode of the twelfth transistor T12 may be connected to the fourth node N4, and the second electrode of the twelfth transistor T12 may be connected to the initialization voltage line VIL.

The thirteenth transistor T13 may be turned on based on the anode initialization signal BCB from the anode initialization line GBL and electrically connect the seventh node N7 to the second low potential line VSL2. During the period in case that the thirteenth transistor T13 is turned on, the seventh node N7 may be discharged to the second low potential voltage VSS2. The gate electrode of the thirteenth transistor T13 may be connected to the anode initialization line GBL, the first electrode of the thirteenth transistor T13 may be connected to the seventh node N7, and the second electrode of the thirteenth transistor T13 may be connected to the second low potential line VSL2.

The second capacitor C2 may be connected between the fourth node N4 and the second high potential line VDL2. The first capacitor electrode of the second capacitor C2 may be connected to the fourth node N4, and the second capacitor electrode may be connected to the second high potential line VDL2. The second capacitor C2 may maintain the potential difference between the fourth node N4 and the second high potential line VDL2.

The first through third, sixth through ninth, and twelfth transistors T1 through T3, T6 through T9, and T12 may each include an oxide-based semiconductor layer. The fourth, fifth, tenth, eleventh, and thirteenth transistors T4, T5, T10, T11, and T13 may each include a polysilicon- or amorphous silicon-based semiconductor layer.

The disclosure is not limited to the illustration in FIG. 10. By way of example, at least one of the first through third, sixth through ninth, and twelfth transistors T1 through T3, T6 through T9, and T12 may include a silicon-based semiconductor layer, and at least one of the fourth, fifth, tenth, eleventh, and thirteenth transistors T4, T5, T10, T11, and T13 may include an oxide-based semiconductor layer.

Figure 11:
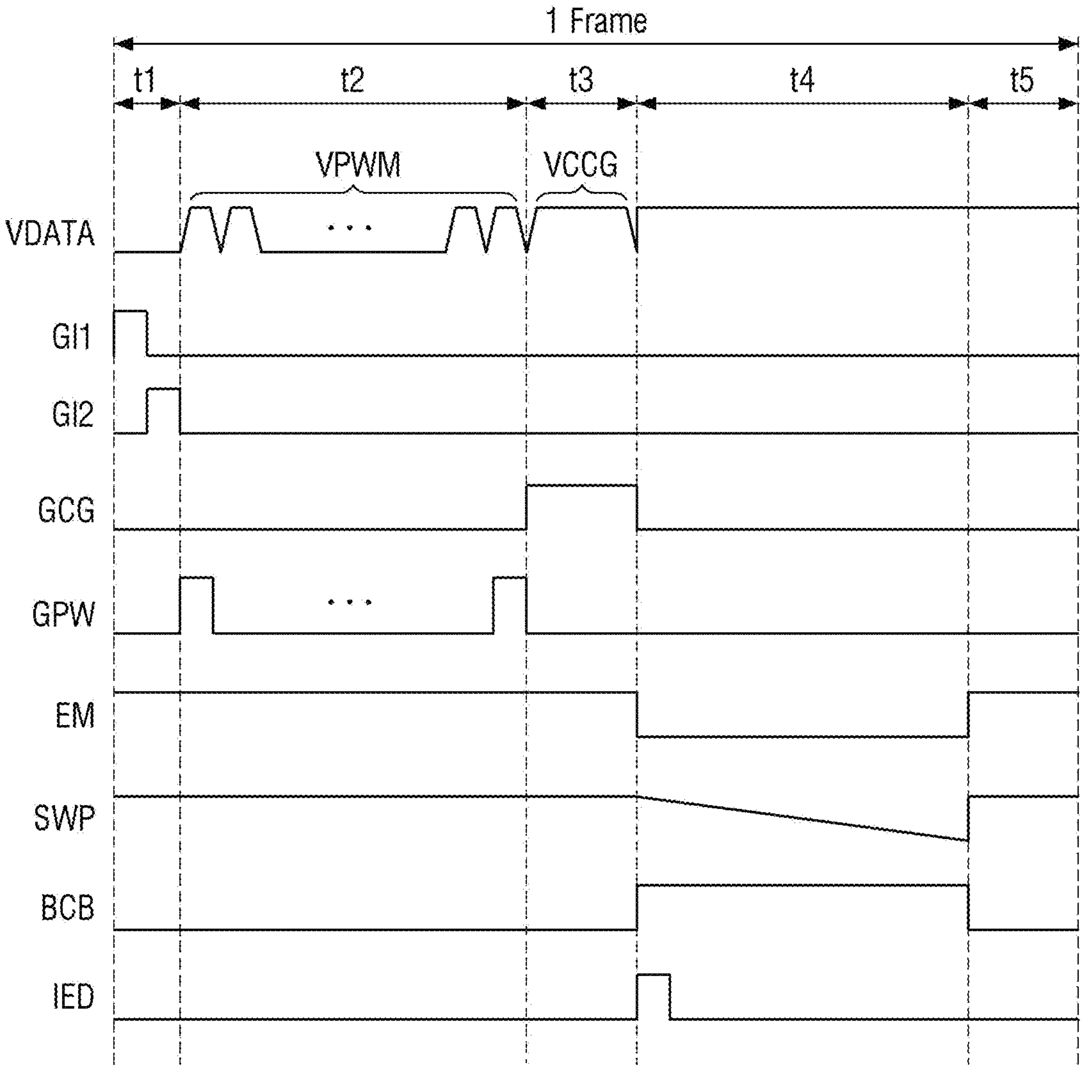
FIG. 11 is an example of waveform diagram illustrating signals applied to the pixel according to the embodiment of FIG. 10.

FIG. 11 is an example of waveform diagram illustrating signals applied to the pixel according to the embodiment of FIG. 10.

Referring to FIG. 11, each pixel SP may be connected to a first scan initialization line GIL1, a second scan initialization line GIL2, a first scan write line GPWL, a second scan write line GCGL, an anode initialization line GBL, an emission line EML, a sweep line SWPL, and a data line DL.

The first scan initialization line GIL1 may supply a high-level first scan initialization signal GI1 during the first half of a first period t1 of one frame period. The second scan initialization line GIL2 may supply a high-level second scan initialization signal GI2 during the second half of the first period t1. The first scan write line GPWL may supply a high-level first scan write signal GPW during a second period t2. The second scan write line GCGL may supply a high-level second scan write signal GCG during a third period t3. The anode initialization line GBL may supply a low-level anode initialization signal BCB during the first through third periods t1 through t3 and a fifth period t5. The emission line EML may supply a low-level emission signal EM during a fourth period t4. The sweep line SWPL may supply a sweep signal SWP during the fourth period t4. The sweep signal SWP may have a pulse that linearly decreases from a gate-high voltage VGH to a gate-low voltage VGL. A data voltage VDATA from the data line DL may be a first data voltage VPWM during the second period t2 and a second data voltage VCCG during the third period t3. The driving current IED may be supplied to the light-emitting element ED during the fourth period t4.

Therefore, rows of pixels SP may emit light simultaneously during the fourth period t4 based on the first data voltage VPWM received during the second period t2 and the second data voltage VCCG received during the third period t3.

Figure 12:
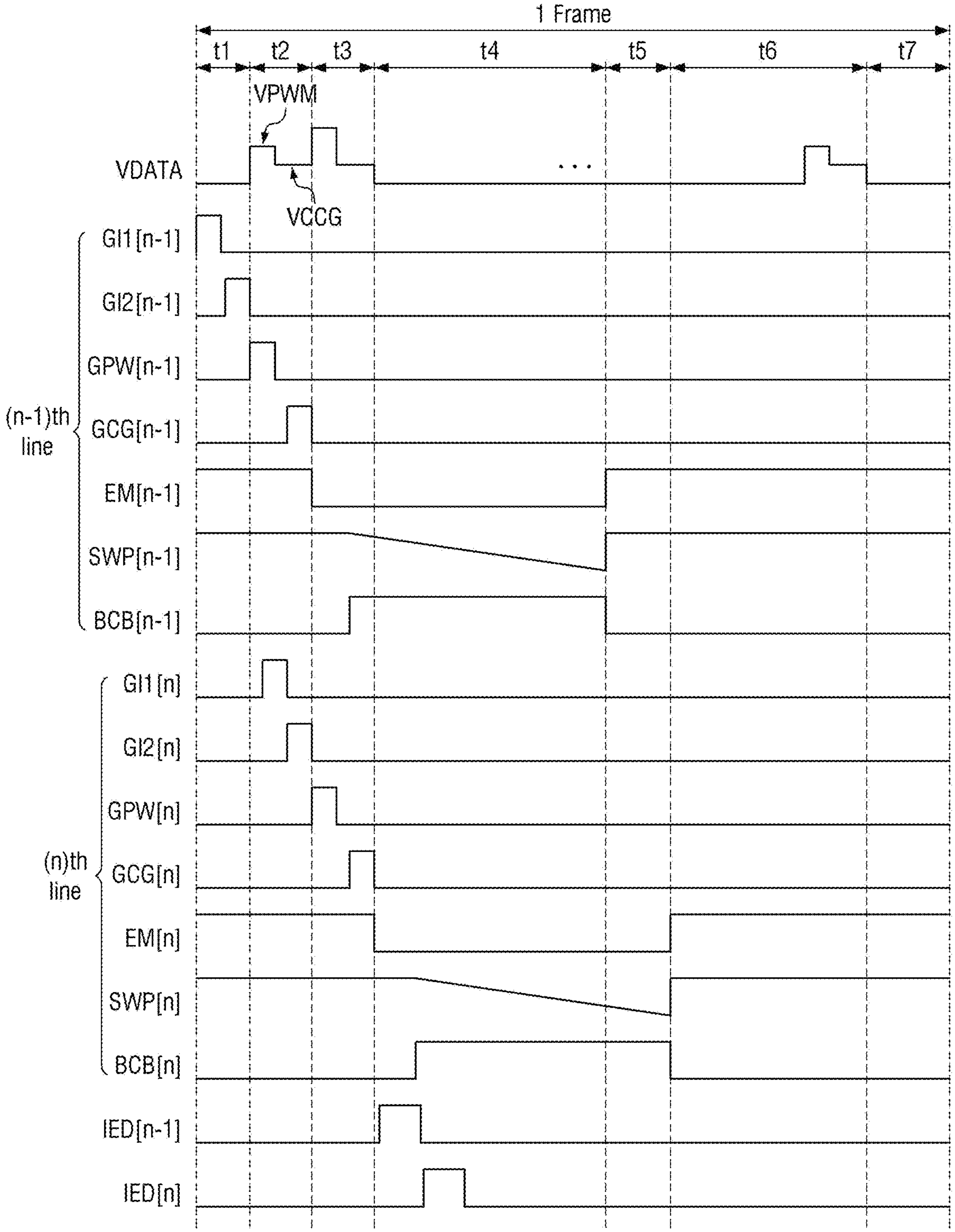
FIG. 12 is another example of waveform diagram illustrating signals applied to the pixel according to the embodiment of FIG. 10.

FIG. 12 is another example of waveform diagram illustrating signals applied to the pixel according to the embodiment of FIG. 10.

Referring to FIG. 12, each pixel SP may be connected to a first scan initialization line GIL1, a second scan initialization line GIL2, a first scan write line GPWL, a second scan write line GCGL, an anode initialization line GBL, an emission line EML, a sweep line SWPL, and a data line DL. For example, pixels SP in an (n−1)-th line (where n is an integer of 2 or greater) may be connected to a first scan initialization line GIL1, a second scan initialization line GIL2, a first scan write line GPWL, a second scan write line GCGL, an anode initialization line GBL, an emission line EML, and a sweep line SWPL in the (n−1)-th line, and pixels SP in an n-th line may be connected to a first scan initialization line GIL1, a second scan initialization line GIL2, a first scan write line GPWL, a second scan write line GCGL, an anode initialization line GBL, an emission line EML, and a sweep line SWPL in the n-th line.

The first scan initialization line GIL1 in the (n−1)-th line may supply a high-level first scan initialization signal GI1[*n*−1] during the first half of a first period t1 of one frame period. The second scan initialization line GIL2 in the (n−1)-th line may supply a high-level second scan initialization signal GI2[*n*−1] during the second half of the first period t1. The first scan write line GPWL in the (n−1)-th line may supply a high-level first scan write signal GPW[n−1] during the first half of a second period t2. The second scan write line GCGL in the (n−1)-th line may supply a high-level second scan write signal GCG[n−1] during the second half of the second period t2. The anode initialization line GBL in the (n−1)-th line may supply a low-level anode initialization signal BCB[n−1] during the first and second periods t1 and t2, the first half of a third period t3, and fifth through seventh periods t5 through t7. The emission line EML in the (n−1)-th line may supply a low-level emission signal EM[n−1] during the third period t3 and a fourth period t4. The sweep line SWPL in the (n−1)-th line may supply a sweep signal SWP[n−1] during the third and fourth periods t3 and t4. The sweep signal SWP[n−1] may have a pulse that linearly decreases from a gate-high voltage VGH to a gate-low voltage VGL. A data voltage VDATA from the data line DL may be a first data voltage VPWM during the first half of the second period t2 and a second data voltage VCCG during the second half of the second period t2. Therefore, a driving current IED[n−1] flowing through the pixels SP in the (n−1)-th line may be supplied to the corresponding light-emitting elements ED during the initial part of the fourth period t4.

The first scan initialization line GIL1 in the n-th line may supply a high-level first scan initialization signal GI1[*n*] during the first half of the second period t2. The second scan initialization line GIL2 in the n-th line may supply a high-level second scan initialization signal GI2[*n*] during the second half of the second period t2. The first scan write line GPWL in the n-th line may supply a high-level first scan write signal GPW[n] during the first half of the third period t3. The second scan write line GCGL in the n-th line may supply a high-level second scan write signal GCG[n] during the second half of the third period t3. The anode initialization line GBL in the n-th line may supply a low-level anode initialization signal BCB[n] during the first through third periods t1 through t3, the first half of the fourth period t4, and the sixth and seventh periods t6 and t7. The emission line EML in the n-th line may supply a low-level emission signal EM[n] during the fourth and fifth periods t4 and t5. The sweep line SWPL in the n-th line may supply a sweep signal SWP[n] during the fourth and fifth periods t4 and t5. The sweep signal SWP[n] may have a pulse that linearly decreases from the gate-high voltage VGH to the gate-low voltage VGL. The data voltage VDATA from the data line DL may be the first data voltage VPWM during the first half of the third period t3 and the second data voltage VCCG during the second half of the third period t3. Therefore, a driving current IED[n] flowing through the pixels SP in the n-th line may be supplied to the corresponding light-emitting elements ED immediately after the driving current IED[n−1] flows in the (n−1)-th line.

Therefore, rows of pixels SP can emit light sequentially during the fourth period t4 based on the first and second data voltages VPWM and VCCG supplied sequentially line-by-line during one frame period.

Figure 13:
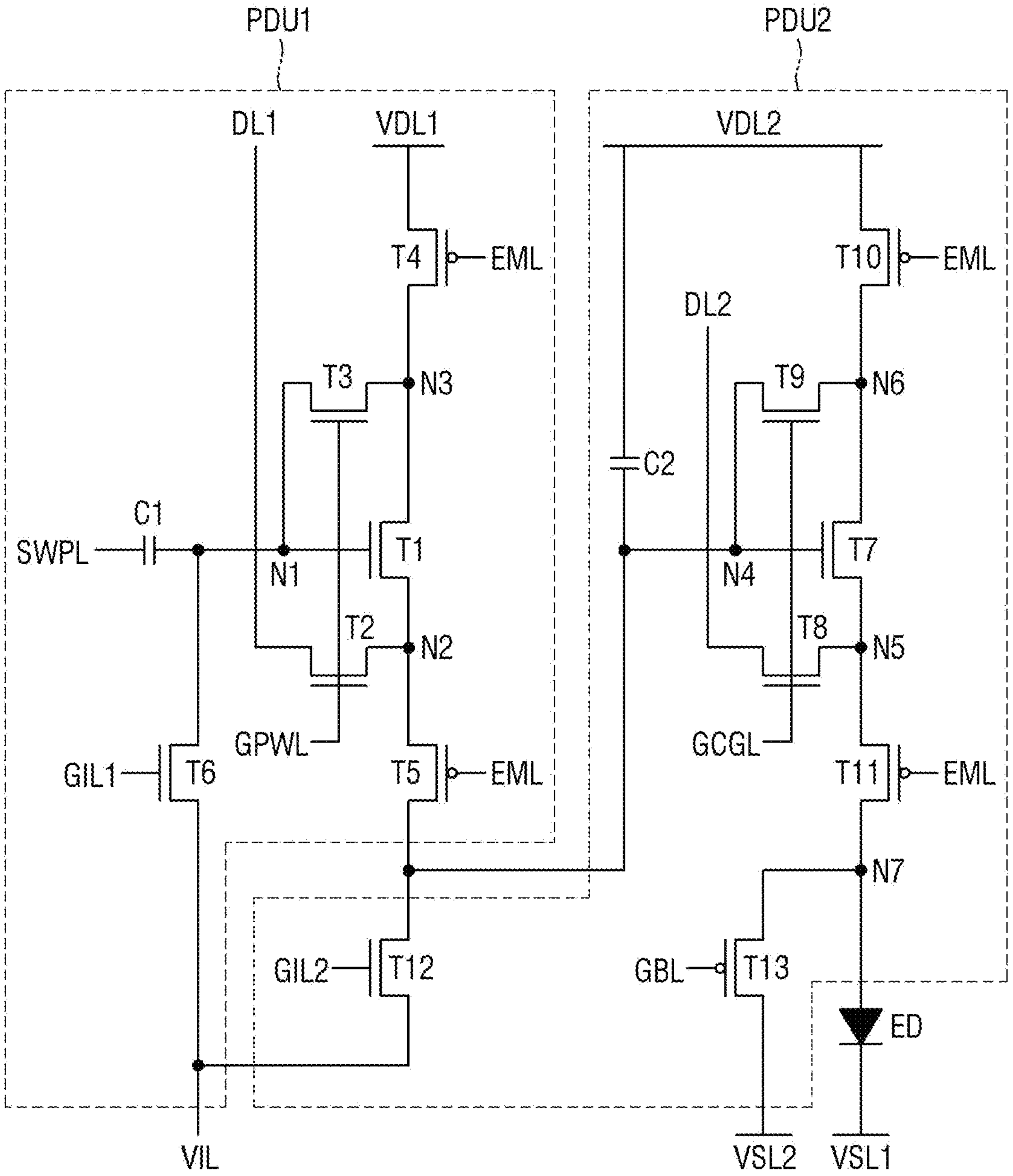
FIG. 13 is a schematic diagram of an equivalent circuit of a pixel according to an embodiment of the disclosure.

FIG. 13 is a schematic diagram of an equivalent circuit of a pixel according to an embodiment of the disclosure.

Referring to FIG. 13, a pixel SP may be connected to a first scan initialization line GIL1, a second scan initialization line GIL2, a first scan write line GPWL, a second scan write line GCGL, an anode initialization line GBL, an emission line EML, a sweep line SWPL, a first data line DL1, and a second data line DL2. A first data voltage from the first data line DL1 may be a data voltage for PWM, and a second data voltage from the second data line DL2 may be a data voltage for CCG.

The pixel SP may be connected to a first high potential line VDL1 supplying a first high potential voltage VDD1, a second high potential line VDL2 supplying a second high potential voltage VDD2, a first low potential line VSL1 supplying a first low potential voltage VSS1, a second low potential line VSL2 supplying a second low potential voltage VSS2, and an initialization voltage line VIL supplying an initialization voltage VIN.

The pixel SP may include a first pixel driver PDU1, a second pixel driver PDU2, and a light-emitting element ED.

The light-emitting element ED may receive a driving current IED generated by the second pixel driver PDU2 to emit light. The light-emitting element ED may be disposed between a seventh node N7 and the first low potential line VSL1. The first electrode of the light-emitting element ED may be electrically connected to the second electrode of an eleventh transistor T11 and the first electrode of a thirteenth transistor T13 through the seventh node N7. The second electrode of the light-emitting element ED may be electrically connected to the first low potential line VSL1 to receive the first low potential voltage VSS1. The first electrode of the light-emitting element ED may be an anode, and the second electrode of the light-emitting element ED may be a cathode. The light-emitting element ED may be an inorganic light-emitting element including a first electrode, a second electrode, and an inorganic semiconductor disposed between the first and second electrodes. For example, the light-emitting element ED may be a micro-LED composed of an inorganic semiconductor, but the disclosure is not limited thereto.

The first pixel driver PDU1 may generate a control current based on the first data voltage from the first data line DL1 to control the voltage of a fourth node N4 of the second pixel driver PDU2. The control current of the first pixel driver PDU1 may adjust the pulse width of the voltage applied to the first electrode of the light-emitting element ED. The first pixel driver PDU1 may perform PWM for the voltage applied to the first electrode of the light-emitting element ED. Therefore, the first pixel driver PDU1 may be a PWM unit.

The first pixel driver PDU1 may include first through sixth transistors T1 through T6 and a first capacitor C1.

The first transistor T1 may control the control current flowing between its first and second electrodes based on the first data voltage applied to its gate electrode, which is a first node N1.

The second transistor T2 may be turned on based on a first scan write signal from the first scan write line GPWL and supply the first data voltage from the first data line DL1 to the first electrode of the first transistor T1, which is a second node N2. The gate electrode of the second transistor T2 may be connected to the first scan write line GPWL, the first electrode of the second transistor T2 may be connected to the first data line DL1, and the second electrode of the second transistor T2 may be connected to the second node N2.

The third transistor T3 may be turned on based on the first scan write signal from the first scan write line GPWL and electrically connect the second electrode of the first transistor T1, which is a third node N3, to the first node N1. The gate electrode of the third transistor T3 may be connected to the first scan write line GPWL, the first electrode of the third transistor T3 may be connected to the third node N3, and the second electrode of the third transistor T3 may be connected to the first node N1. Therefore, the first transistor T1 may operate as a diode during the period in case that the third transistor T3 is turned on.

The fourth transistor T4 may be turned on based on an emission signal from the emission line EML and supply the first high potential voltage VDD1 to the third node N3. The gate electrode of the fourth transistor T4 may be connected to the emission line EML, the first electrode of the fourth transistor T4 may be connected to the first high potential line VDL1, and the second electrode of the fourth transistor T4 may be connected to the third node N3.

The fifth transistor T5 may be turned on based on the emission signal from the emission line EML and electrically connect the second node N2 to the fourth node N4 of the second pixel driver PDU2. The gate electrode of the fifth transistor T5 may be connected to the emission line EML, the first electrode of the fifth transistor T5 may be connected to the second node N2, and the second electrode of the fifth transistor T5 may be connected to the fourth node N4. Therefore, the fifth transistor T5 may supply the control current to the gate electrode of a seventh transistor T7, which is the fourth node N4, and the seventh transistor T7 may adjust the pulse width of the voltage applied to the first electrode of the light-emitting element ED based on the voltage of the fourth node N4.

The sixth transistor T6 may be turned on based on a first scan initialization signal from the first scan initialization line GIL1 and electrically connect the first node N1 to the initialization voltage line VIL. The gate electrode of the sixth transistor T6 may be connected to the first scan initialization line GIL1, the first electrode of the sixth transistor T6 may be connected to the first node N1, and the second electrode of the sixth transistor T6 may be connected to the initialization voltage line VIL.

The first capacitor C1 may be connected between the first node N1 and the sweep line SWPL. The first capacitor electrode of the first capacitor C1 may be connected to the first node N1, and the second capacitor electrode of the first capacitor C1 may be connected to the sweep line SWPL. The first capacitor C1 may maintain the potential difference between the first node N1 and the sweep line SWPL.

The second pixel driver PDU2 may generate the driving current IED supplied to the light-emitting element ED based on the second data voltage from the second data line DL2. The second pixel driver PDU2 may receive the second data voltage, which is a constant voltage, and generate a constant current supplied to the light-emitting element ED regardless of the luminance of the pixel SP. Therefore, the second pixel driver PDU2 may be a CCG unit.

The second pixel driver PDU2 may include the seventh transistor T7, eighth through tenth transistors T8 through T10, the eleventh transistor T11, a twelfth transistor T12, a thirteenth transistor T13, and a second capacitor C2.

The seventh transistor T7 may control the driving current IED flowing between its first and second electrodes based on the second data voltage applied to its gate electrode, which is the fourth node N4. The seventh transistor T7 may control the period during which the driving current IED flows through the light-emitting element ED.

The eighth transistor T8 may be turned on based on a second scan write signal from the second scan write line GCGL and supply the second data voltage from the second data line DL2 to a fifth node N5, which is the first electrode of the seventh transistor T7. The gate electrode of the eighth transistor T8 may be connected to the second scan write line GCGL, the first electrode of the eighth transistor T8 may be connected to the second data line DL2, and the second electrode of the eighth transistor T8 may be connected to the fifth node N5.

The ninth transistor T9 may be turned on based on the second scan write signal from the second scan write line GCGL and electrically connect a sixth node N6, which is the second electrode of the seventh transistor T7, to the fourth node N4. The gate electrode of the ninth transistor T9 may be connected to the second scan write line GCGL, the first electrode of the ninth transistor T9 may be connected to the sixth node N6, and the second electrode of the ninth transistor T9 may be connected to the fourth node N4. Therefore, the seventh transistor T7 may operate as a diode during the period in case that the ninth transistor T9 is turned on.

The tenth transistor T10 may be turned on based on the emission signal from the emission line EML and supply the second high potential voltage VDD2 to the sixth node N6. The gate electrode of the tenth transistor T10 may be connected to the emission line EML, the first electrode of the tenth transistor T10 may be connected to the second high potential line VDL2, and the second electrode of the tenth transistor T10 may be connected to the sixth node N6.

The eleventh transistor T11 may be turned on based on the emission signal from the emission line EML and electrically connect the fifth node N5 to the seventh node N7, which is the first electrode of the light-emitting element ED. The gate electrode of the eleventh transistor T11 may be connected to the emission line EML, the first electrode of the eleventh transistor T11 may be connected to the fifth node N5, and the second electrode of the eleventh transistor T11 may be connected to the seventh node N7.

The twelfth transistor T12 may be turned on based on the second scan initialization signal from the second scan initialization line GIL2 and electrically connect the fourth node N4 to the initialization voltage line VIL. The gate electrode of the twelfth transistor T12 may be connected to the second scan initialization line GIL2, the first electrode of the twelfth transistor T12 may be connected to the fourth node N4, and the second electrode of the twelfth transistor T12 may be connected to the initialization voltage line VIL.

The thirteenth transistor T13 may be turned on based on an anode initialization signal BCB from the anode initialization line GBL and electrically connect the seventh node N7 to the second low potential line VSL2. During the period in case that the thirteenth transistor T13 is turned on, the seventh node N7 may be discharged to the second low potential voltage VSS2. The gate electrode of the thirteenth transistor T13 may be connected to the anode initialization line GBL, the first electrode of the thirteenth transistor T13 may be connected to the seventh node N7, and the second electrode of the thirteenth transistor T13 may be connected to the second low potential line VSL2.

The second capacitor C2 may be connected between the fourth node N4 and the second high potential line VDL2. The first capacitor electrode of the second capacitor C2 may be connected to the fourth node N4, and the second capacitor electrode of the second capacitor C2 may be connected to the second high potential line VDL2. The second capacitor C2 may maintain the potential difference between the fourth node N4 and the second high potential line VDL2.

The first through third, sixth through ninth, and twelfth transistors T1 through T3, T6 through T9, and T12 may each include an oxide-based semiconductor layer. The fourth, fifth, tenth, eleventh, and thirteenth transistors T4, T5, T10, T11, and T13 may each include a polysilicon- or amorphous silicon-based semiconductor layer.

The disclosure is not limited to the illustration in FIG. 13. By way of example, at least one of the first through third, sixth through ninth, and twelfth transistors T1 through T3, T6 through T9, and T12 may each include a silicon-based semiconductor layer, and at least one of the fourth, fifth, tenth, eleventh, and thirteenth transistors T4, T5, T10, T11, and T13 may each include an oxide-based semiconductor layer.

Figure 14:
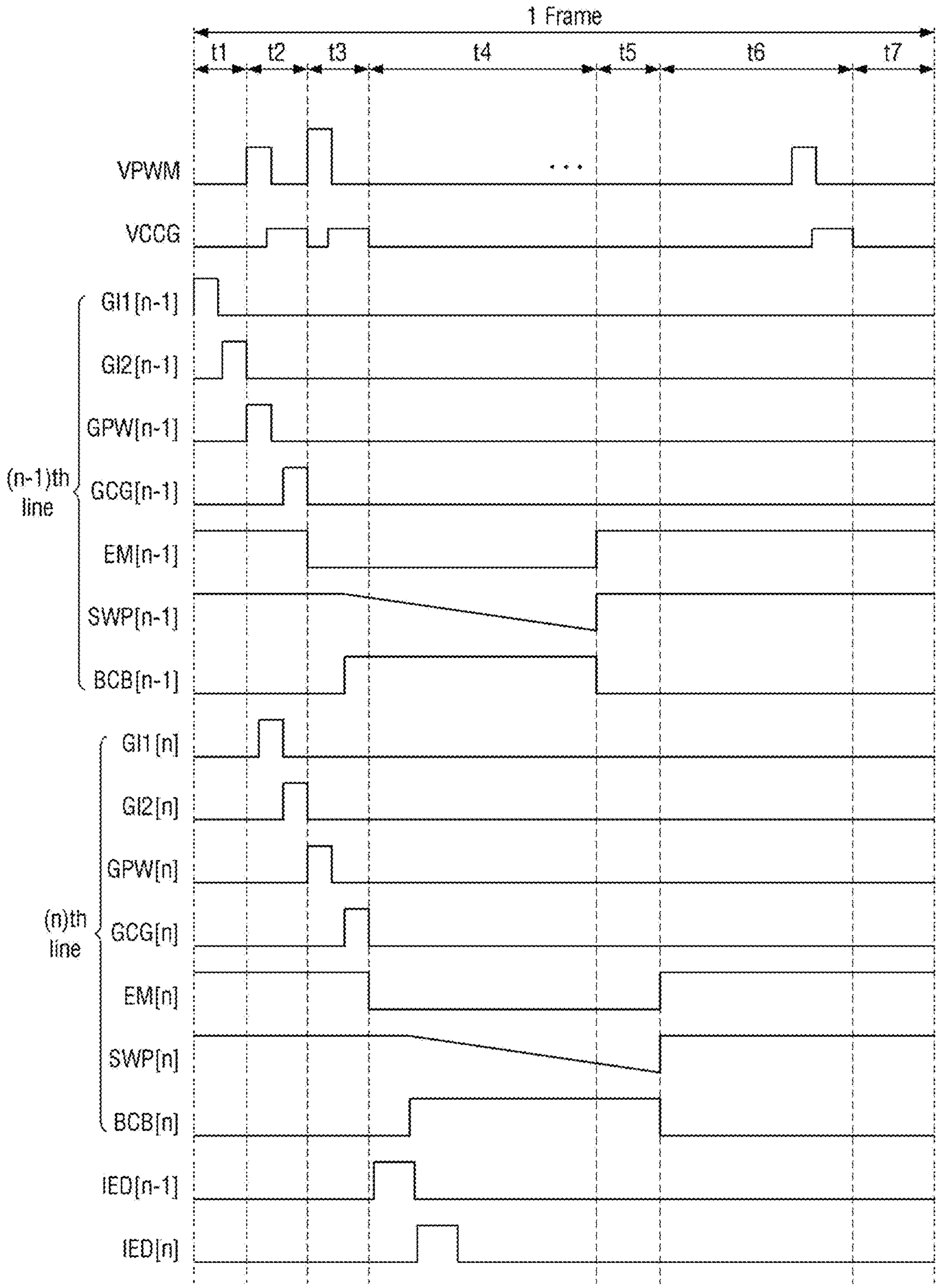
FIG. 14 is an example of a waveform diagram illustrating signals applied to the pixel according to the embodiment of FIG. 13.

FIG. 14 is an example of a waveform diagram illustrating signals applied to the pixel according to the embodiment of FIG. 13.

Referring to FIG. 14, each pixel SP may be connected to a first scan initialization line GIL1, a second scan initialization line GIL2, a first scan write line GPWL, a second scan write line GCGL, an anode initialization line GBL, an emission line EML, a sweep line SWPL, a first data line DL1, and a second data line DL2.

A first scan initialization line GIL1 in an (n−1)-th line (where n is an integer of 2 or greater) may supply a high-level first scan initialization signal GI1[*n*−1] during the first half of a first period t1 of one frame period. A second scan initialization line GIL2 in the (n−1)-th line may supply a high-level second scan initialization signal GI2[*n*−1] during the second half of the first period t1. A first scan write line GPWL in the (n−1)-th line may supply a high-level first scan write signal GPW[n−1] during the first half of a second period t2. A second scan write line GCGL in the (n−1)-th line may supply a high-level second scan write signal GCG[n−1] during the second half of the second period t2. An anode initialization line GBL in the (n−1)-th line may supply a low-level anode initialization signal BCB[n−1] during the first and second periods t1 and t2, the first half of a third period t3, and fifth through seventh periods t5 through t7. An emission line EML in the (n−1)-th line may supply a low-level emission signal EM[n−1] during the third period t3 and a fourth period t4. A sweep line SWPL in the (n−1)-th line may supply a sweep signal SWP[n−1] during the third and fourth periods t3 and t4. The sweep signal SWP[n−1] may have a pulse that linearly decreases from a gate-high voltage VGH to a gate-low voltage VGL. The first data line DL1 may supply a first data voltage VPWM during the first half of the second period t2. The second data line DL2 may supply a second data voltage VCCG during the second half of the second period t2. Therefore, a driving current IED[n−1] flowing through pixels SP in the (n−1)-th line may be supplied to the corresponding light-emitting elements ED during the initial part of the fourth period t4.

A first scan initialization line GIL1 in an n-th line may supply a high-level first scan initialization signal GI1[*n*] during the first half of the second period t2. A second scan initialization line GIL2 in the n-th line may supply a high-level second scan initialization signal GI2[*n*] during the second half of the second period t2. A first scan write line GPWL in the n-th line may supply a high-level first scan write signal GPW[n] during the first half of the third period t3. A second scan write line GCGL in the n-th line may supply a high-level second scan write signal GCG[n] during the second half of the third period t3. An anode initialization line GBL in the n-th line may supply a low-level anode initialization signal BCB[n] during the first through third periods t1 through t3, the first half of the fourth period t4, and the sixth and seventh periods t6 and t7. An emission line EML in the n-th line may supply a low-level emission signal EM [n] during the fourth and fifth periods t4 and t5. A sweep line SWPL in the n-th line may supply a sweep signal SWP[n] during the fourth and fifth periods t4 and t5. The sweep signal SWP[n] may have a pulse that linearly decreases from the gate-high voltage VGH to the gate-low voltage VGL. The first data line DL1 may supply the first data voltage VPWM during the first half of the third period t3. The second data line DL2 may supply the second data voltage VCCG during the second half of the third period t3. Therefore, a driving current IED[n] flowing through pixels SP in the n-th line may be supplied to the corresponding light-emitting elements ED immediately after the driving current IED[n−1] flows in the (n−1)-th line.

Therefore, rows of pixels SP can emit light sequentially during the fourth period t4 based on the first and second data voltages VPWM and VCCG supplied sequentially line-by-line during one frame period.

Figure 15:
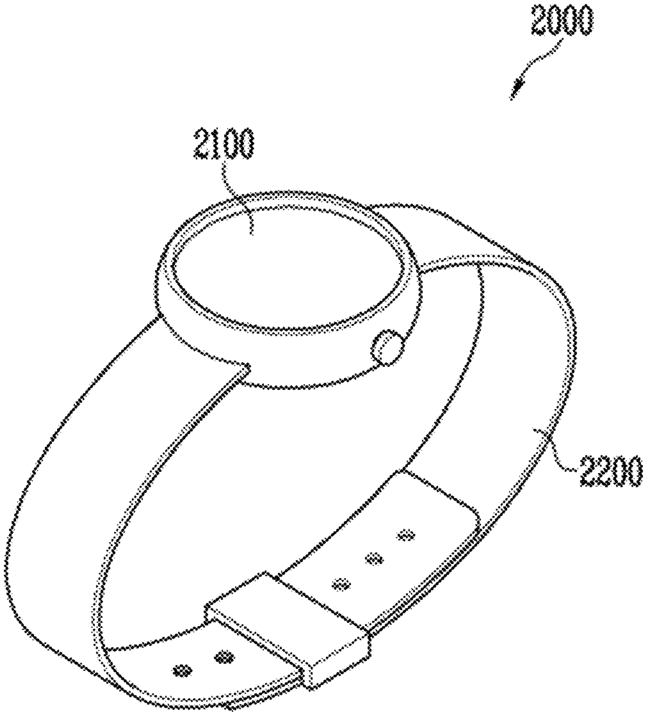
FIGS. 15 and 16 are schematic perspective views illustrating application examples of the electronic devices.

Referring to FIG. 15, the electronic device may be applied to a smart watch 2000 including a display part 2100 and a strap part 2200.

The smart watch 2000 may be a wearable electronic device. For example, the smart watch 2000 may have a structure in which the strap part 2200 is mounted on a wrist of a user. The electronic device may be applied to the display part 2100, so that image data including time information can be provided to the user.

Figure 16:
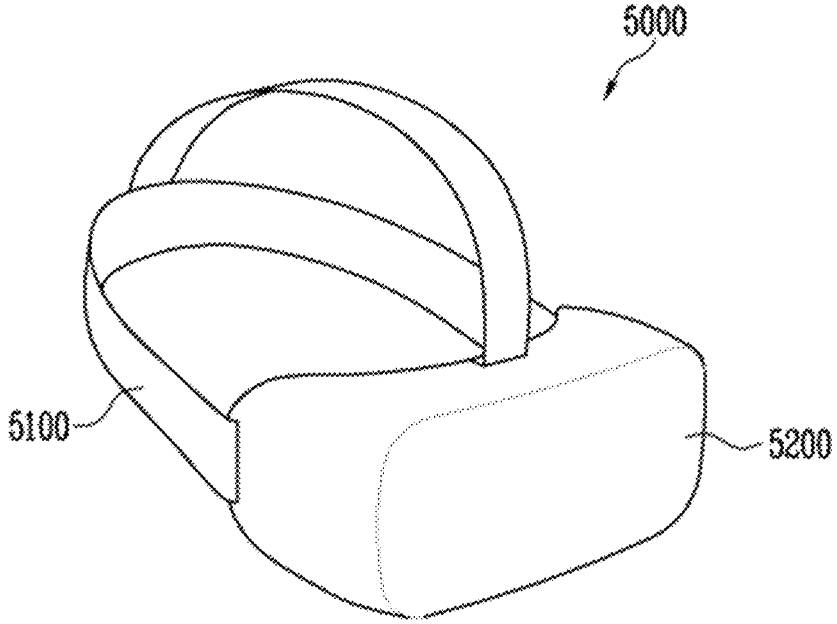

Referring to FIG. 16, the electronic device may be applied to a head mounted display device 5000.

The head mounted display device 5000 may be a wearable electronic device which can be worn on the head of a user. For example, the head mounted display device 5000 may be a wearable device for virtual reality (VR) or mixed reality (MR). The head mounted display device 5000 may include a head mounted band 5100 and a display accommodating case 5200. The head mounted band 5100 may be connected to the display accommodating case 5200. The head mounted band 5100 may include a horizontal band and/or a vertical band, used to fix the head mounted display device 5000 to the head of the user. The horizontal band may be configured to surround a side portion of the head of the user, and the vertical band may be configured to surround an upper portion of the head of the user. However, embodiments are not limited thereto. For example, the head mounted band 5100 may be implemented in the form of a glasses frame, a helmet or the like within the spirit and the scope of the disclosure.

The above descriptions are of technical features of the disclosure, and those skilled in the art to which the disclosure pertains will be able to make various modifications and variations. Therefore, the embodiments of the disclosure described above may be implemented separately or in combination with each other.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display device comprising:
- a light-emitting element;
- a first transistor that controls a control current based on a voltage of a first node;
- a second transistor that electrically connects a second node, which is a first electrode of the first transistor, to a data line based on a first scan write signal;
- a third transistor that electrically connects a third node, which is a second electrode of the first transistor, to the first node based on the first scan write signal;
- a fourth transistor that controls a driving current supplied to the light-emitting element based on a voltage of a fourth node that receives the control current;
- a fifth transistor that electrically connects a fifth node, which is a first electrode of the fourth transistor, to the data line based on a second scan write signal; and
- a sixth transistor that electrically connects a sixth node, which is a second electrode of the fourth transistor, to the fourth node based on the second scan write signal.

2. The display device of claim 1, wherein
- the data line supplies a first data voltage with a gradation value during a period in case that the second transistor and the third transistor are turned on, and
- the data line supplies a second data voltage that is a constant voltage during a period in case that the fifth transistor and the sixth transistor are turned on.

3. The display device of claim 1, further comprising:
- a sweep line that supplies a sweep signal with a pulse linearly decreasing from a gate-high voltage to a gate-low voltage; and
- a first capacitor having a first capacitor electrode electrically connected to the first node and a second capacitor electrode electrically connected to the sweep line.

4. The display device of claim 1, wherein the first transistor, the second transistor, the third transistor, the fourth transistor, the fifth transistor and the sixth transistor include an oxide-based semiconductor layer.

5. The display device of claim 1, further comprising:
- a seventh transistor that supplies a first high potential voltage to the third node based on an emission signal;
- an eighth transistor that electrically connects the second node and the fourth node based on the emission signal;
- a ninth transistor that supplies a second high potential voltage to the sixth node based on the emission signal; and
- a tenth transistor that electrically connects the fifth node and a seventh node, which is a first electrode of the light-emitting element, based on the emission signal.

6. The display device of claim 5, wherein the seventh transistor, the eighth transistor, the ninth transistor, and the tenth transistor include a low-temperature polysilicon-based semiconductor layer.

7. The display device of claim 5, further comprising:
- an eleventh transistor that discharges the first node to an initialization voltage based on a first scan initialization signal;
- a twelfth transistor that discharges the fourth node to the initialization voltage based on a second scan initialization signal;
- a first low potential line that supplies a first low potential voltage to a second electrode of the light-emitting element;
- a thirteenth transistor that discharges the seventh node to a second low potential voltage based on the voltage of the fourth node; the eleventh transistor and the twelfth transistor include an oxide-based semiconductor layer; and
- the thirteenth transistor includes a low-temperature polysilicon-based semiconductor layer.

8. The display device of claim 7, further comprising:
a first low potential line that supplies a first low potential voltage to a second electrode of the light-emitting element; and
a thirteenth transistor that discharges the seventh node to a second low potential voltage based on an anode initialization signal.

9. A display device comprising:
a light-emitting element;
a first transistor that controls a control current based on a voltage of a first node;
a second transistor that electrically connects a second node, which is a first electrode of the first transistor, to a data line during a first period;
a third transistor that electrically connects a third node, which is a second electrode of the first transistor, to the first node during the first period;
a fourth transistor that controls a driving current supplied to the light-emitting element based on a voltage of a fourth node that receives the control current;
a fifth transistor that electrically connects a fifth node, which is a first electrode of the fourth transistor, to the data line during a second period subsequent to the first period; and
a sixth transistor that electrically connects a sixth node, which is a second electrode of the fourth transistor, to the fourth node during the second period.

10. The display device of claim 9, wherein
the data line supplies a first data voltage with a gradation value during the first period, and
the data line supplies a second data voltage that is a constant voltage during the second period.

11. The display device of claim 9, further comprising:
a sweep line that supplies a sweep signal with a pulse linearly decreasing from a gate-high voltage to a gate-low voltage during a third period subsequent to the second period; and
a first capacitor having a first capacitor electrode electrically connected to the first node and a second capacitor electrode electrically connected to the sweep line.

12. The display device of claim 9, wherein
the second transistor and the third transistor are turned on during the first period by receiving a high-level first scan write signal, and
the fifth transistor and the sixth transistor are turned on during the second period by receiving a high-level second scan write signal.

13. The display device of claim 9, further comprising:
a seventh transistor that supplies a first high potential voltage to the third node during a third period subsequent to the second period;
an eighth transistor that electrically connects the second node and the fourth node during the third period;
a ninth transistor that supplies a second high potential voltage to the sixth node during the third period; and
a tenth transistor that electrically connects the fifth node and a seventh node, which is a first electrode of the light-emitting element, during the third period.

14. The display device of claim 13, wherein the seventh transistor, the eighth transistor, the ninth transistor, and the tenth transistor are turned on by receiving a low-level emission signal during the third period.

15. The display device of claim 13, further comprising:
an eleventh transistor that discharges the first node to an initialization voltage during a fourth period prior to the first period;
a twelfth transistor that discharges the fourth node to the initialization voltage during the fourth period;
a first low potential line that supplies a first low potential voltage to a second electrode of the light-emitting element;
a thirteenth transistor that discharges the seventh node to a second low potential voltage during a fifth period subsequent to the third period;
the eleventh transistor is turned on during the fourth period by receiving a high-level first scan initialization signal; and
the twelfth transistor is turned on during the fourth period and the fifth period by receiving a high-level second scan initialization signal.

16. A display device comprising:
a first pixel disposed in a first row; and
a second pixel disposed in a second row subsequent to the first row, wherein
the first pixel includes a (1-1)-th light-emitting element; a (1-1)-th transistor that controls a control current based on a voltage of a gate electrode of the (1-1)-th transistor; a (1-2)-th transistor that electrically connects a first electrode of the (1-1)-th transistor to a data line during a first half of a first period; a (1-3)-th transistor that electrically connects a second electrode of the (1-1)-th transistor to the gate electrode of the (1-1)-th transistor during the first half of the first period; a (1-4)-th transistor that controls a driving current supplied to the (1-1)-th light-emitting element based on a voltage of a first node that receives the control current of the (1-1)-th transistor; a (1-5)-th transistor that electrically connects a first electrode of the (1-4)-th transistor to the data line during a second half of the first period; and a (1-6)-th transistor that electrically connects a second electrode of the (1-4)-th transistor to the first node during the second half of the first period, and
the second pixel includes a second light-emitting element; a (2-1)-th transistor that controls a control current based on a voltage of a gate electrode of the (2-1)-th transistor; a (2-2)-th transistor that electrically connects a first electrode of the (2-1)-th transistor to a data line during the first half of a second period subsequent to the first period; a (2-3)-th transistor that electrically connects a second electrode of the (2-1)-th transistor to a gate electrode of the (2-1)-th transistor during the first half of the second period; a (2-4)-th transistor that controls a driving current supplied to the second light-emitting element based on a voltage of a second node that receives the control current of the (2-1)-th transistor; a (2-5)-th transistor that electrically connects a first electrode of the (2-4)-th transistor to the data line during the second half of the second period; and a (2-6)-th transistor that electrically connects a second electrode of the (2-4)-th transistor to the second node during the second half of the second period.

17. An electronic device comprising:
the display device of claim 1.

18. The electronic device of claim 17, wherein
the data line supplies a first data voltage with a gradation value during a period in case that the second transistor and the third transistor are turned on, and
the data line supplies a second data voltage that is a constant voltage during a period in case that the fifth transistor and the sixth transistor are turned on.

19. The electronic device of claim 17, wherein the display device further comprises:

a sweep line that supplies a sweep signal with a pulse linearly decreasing from a gate-high voltage to a gate-low voltage; and a first capacitor having a first capacitor electrode electrically connected to the first node and a second capacitor electrode electrically connected to the sweep line.

20. The electronic device of claim 17, wherein the electronic device is at least one of a smart watch, a mobile phone, a smartphone, a portable computer, a tablet personal computer (PC), a watch phone, an automotive display, a smart glass, a portable multimedia player (PMP), a navigation system, an ultra mobile computer (UMPC), a head mounted display (HMD) device, a virtual reality (VR) device, a mixed reality (MR) device, and an augmented reality (AR) device.

* * * * *